US005607859A

United States Patent [19]

Biemann et al.

[11] Patent Number: 5,607,859

[45] Date of Patent: Mar. 4, 1997

[54] METHODS AND PRODUCTS FOR MASS SPECTROMETRIC MOLECULAR WEIGHT DETERMINATION OF POLYIONIC ANALYTES EMPLOYING POLYIONIC REAGENTS

[75] Inventors: Klaus Biemann, Alton Bay, N.H.; Peter Juhasz, Everett, Mass.

[73] Assignee: Massachusetts Institute of Technology, Cambridge, Mass.

[21] Appl. No.: 218,608

[22] Filed: Mar. 28, 1994

[51] Int. Cl.[6] .................... G01N 24/00

[52] U.S. Cl. .................... 436/173; 436/86; 436/87; 436/94

[58] Field of Search .................... 436/173, 94, 86, 436/87

[56] References Cited

PUBLICATIONS

McNeal, C. et al., A Novel Mass Spectrometric Procedure to Rapidly Determine the Partial Structure of Heparin Fragments, Biochem. and Biophys. Research Comm., V. 139, No. 1, Aug. 29, 1986, pp. 18–24.
Mallis, L. et al., Sequence Analysis of Highly Sulfated, Heparin–Derived Oligosaccharides Using Fast Atom Bombardment Mass Spectrometry, Anal. Chem. 1989, 61, 1453–1458.
Juhasz, P. et al., Complex Formation Between Biomolecules in Matrix–Assisted Laser Desorptoin Ionization, 41st ASMS Conference on Mass Spectrometry, Jun. 1, 1993.
K. Harada et al. *Org. Mass Spect.* 1982, 17, 386–391.
C. Sottani et al. *Rapid Commun. Mass Spect.* 1993, 7, 680–683.
N. C. Seeman et al. *Proc. Nat. Acad. Sci. USA* 1976, 73, 804–808.
C. Helene *FEBS Lett.* 1977, 74, 10–13.
H.–R. Schulten et al. *Biol. Abstr*, 1978, 65, 35864.
H. R. Schulten et al. *Biol. Abstr.* 1979, 67, 5197.
K. Harada et al. *Chem. Abstr.* 1982, 98, 54338.
J. H. Clark et al. *J. Am. Chem. Soc* 1984, 106, 4056–4057.
H. Pande et al. *J. Biol. Chem.* 1985, 260, 2301–2306.
J. Calaycay et al. *J Biol. Chem*, 1985, 260, 12136–12141.
M. Karas et al. *Anal. Chim. Acta* 1990, 241, 175–185.
D. P. Michaud et al. Anal. Chem. 1990, 62, 1069–1074.
R. C. Beavis et al. *Proc. Nat. Acad. Sci. USA* 1990, 87, 6873–6877.
S. A. Carr et al. *Anal. Chem.* 1991, 63, 2802–2824.
B. Ganem et al. *J. Am. Chem. Soc.* 1991, 113, 6294–6296.
M. Baca et al. *J. Am. Chem. Soc.* 1992, 114, 3992–3993.
A. K. Ganguly et al. *J. Am. Chem. Soc.* 1992, 114, 6559–6560.
C. Sottani et al. *Chem. Abstr.* 1993, 119, 151732s.
T. J. Thompson et al. *Anal. Chem.* 1993, 65, 900–906.
J. A. Loo et al. *Org. Mass. Spec.* 1993, 28, 1640–1649.
W. B. Knight et al. *Biochemistry* 1993, 32, 2031–2035.
M. C. Fitzgerald et al. *Anal. Chem.* 1993, 65, 3204–3211.
A. K. Ganguly et al. *Tetrahedron* 1993, 49, 7985–7996.
T. Nakanishi et al. *Biol. Mass Spec.* 1994, 23, 230–233.
P. Juhasz et al. *Chem. Abstr.* 1994, 120, 293283.
P. Juhasz et al. *Proc. Nat. Acad. Sci USA* 1994, 91, 4333–4337.

*Primary Examiner*—Jill Warden
*Assistant Examiner*—Arlen Soderquist

[57] ABSTRACT

An improved method for the mass spectrometric determination of the molecular weight of a highly polyionic analyte is provided. The method employs reagents which are highly polyionic but which are of opposite charge to the analytes. The reagents and analytes form a non-covalent complex which is more easily ionized during mass spectrometry and decreases fragmentation of the analyte. Highly polyionic reagents are also provided. The reagents include a multiplicity of highly ionic groups covalently attached along a flexible molecular backbone.

6 Claims, 11 Drawing Sheets

METHODS AND PRODUCTS FOR MASS SPECTROMETRIC MOLECULAR WEIGHT DETERMINATION OF POLYIONIC ANALYTES EMPLOYING POLYIONIC REAGENTS

This invention was made with government support under Grant Number NIH-P41-RR00317 awarded by the National Institutes of Health. The government has certain rights in the invention.

FIELD OF THE INVENTION

The invention relates to the determination of the molecular weight of compounds by mass spectrometry and, in particular, to an improved method of determining the molecular weight of polyionic (i.e. polyacidic or polybasic) analytes employing a polyionic reagent of known molecular weight and opposite charge to form at least one non-covalent complex with such analytes.

BACKGROUND OF THE INVENTION

The determination of the molecular weight of molecules within a sample may be an important first step either in determining the presence of a known molecule in a sample or in determining the structure of an analyte of unknown structure. Various techniques may be employed to determine the molecular weights of analytes depending upon the degree of precision required and the characteristics of the analyte itself. Thus, electrophoresis, centrifugal sedimentation, and mass spectrometry may all find use in different circumstances. Whereas electrophoresis sedimentation provide some measure of accuracy in estimates of molecular weight, mass spectrometry provides for much greater accuracy.

Soft ionization mass spectrometry techniques include fast-atom or ion bombardment (FAB) ionization spectrometry, electrospray spectrometry, plasma desorption mass spectrometry (PDMS), and matrix-assisted laser desorption ionization (MALDI) spectrometry. MALDI, for example, permits the determination of the molecular weight of proteins up to the $10^5$ Da range with an accuracy of 0.1–0.01%, requiring only picomoles or sub-picomoles of material (1–4). The method is equally applicable to smaller biologically important molecules such as peptides (5), carbohydrates (6), oligonucleotides (7,8), glycolipids (9), and polar and nonpolar synthetic polymers (10,11). It has become an important technique in biochemistry and biology not only because the molecular weight of the native material at that level of accuracy is in itself very useful information, but also because the changes thereof upon chemical or enzymatic treatment provide further insight into the structure or biological significance of parts of the native molecule (12). These manipulations are often necessary to obtain structural information because limited excess energy is transferred to the analyte during the MALDI process and "prompt" fragmentation is therefore rarely observed. This feature is an advantage in the analyses of mixtures, as long as the components can be resolved.

Although most of the compounds in the above-mentioned categories are amenable to mass spectrometry, several difficulties arise when the analyte is highly polyionic (i.e. highly polyacidic or highly polybasic). In the first instance, it may simply be difficult to ionize such analytes. Highly acidic compounds, for example, are difficult to ionize even in the negative mode of a mass spectrometer where they are detected as anions. Although attempts have been made to analyze highly polyacidic compounds in the negative mode, most of these efforts have been devoted to oligonucleotides (7,8). It is even more difficult to ionize polysulfate esters or polysulfonic acids. This is due, in part, to the fact that these substances tenaciously attach cations (such as $Na^+$, $K^+$, etc.) to form a multiplicity of analyte-cation complexes. These complexes give rise to broad unresolved peaks in mass spectra, the centroid of which corresponds to the average mass of all these partial salts.

Peptidoglycans (PG) and glycosaminoglycans (GAG) are examples of polyacidic molecules of great biological significance that have been difficult to analyze. Despite their abundance in living organisms as constituents of the extracellular matrix or cell surfaces, and their extensive use in medicine (most importantly, heparin), even the primary structures of some of these highly polar and polydisperse compounds are not well-understood (19,26). In addition to their tendency to form complexes with small cations, these compounds are characterized by variable degrees of sulfation. This is characteristic of, for example, glycosaminoglycans composed of uronic acid and glucosamine residues: heparin, heparan sulfate, dermatan sulfate and chondroitin sulfate. As a result, in contrast to the level of detail with which gene sequences can be determined, even the primary sequences for the GAGs heparin and heparan sulfate are not known. To date, only typical and/or abundant subsequences of GAGs have been characterized by affinity and sizing chromatography of GAG degradation products (27–34).

Mass spectrometry is a particularly useful and general analytical method for problems where structural regularities of the material being investigated allow one to deduce structural details from molecular weight information. This is certainly the case with the GAGs heparin and heparan sulfate, where accurate mass measurement (with, for example, ±0.05% uncertainty) unambiguously identifies oligosaccharides except for structural isomers. Some of these isomeric ambiguities may then be resolved by specific enzymatic reactions. Presumably due to the difficulties of ionizing these compounds in a mass spectrometer, few mass spectrometric studies of GAGs have been reported. Plasma desorption mass spectrometric (PDMS) studies were carried out by McNeal et al. (35), where data on the molecular weights and extent of sulfation were determined for heparin-derived oligosaccharides up to hexasaccharides from 25–50 μg samples (20–30 nmol). Ten nmol sensitivity was reported by Carr and Reinhold (36,20) for chondroitin sulfate oligosaccharides and synthetic heparin oligosaccharides up to pentamers studied by fast atom bombardment (FAB) ionization in the negative ion mode. Somewhat improved performance was obtained by Mallis et al. (21,22) who were able to detect heparin-derived oligosaccharides up to octamers using triethanolamine as FAB matrix rather than the thioglycerol employed earlier by Carr et al. (36). More recently, electrospray studies were conducted on disaccharides with further improved sensitivity (100 pmol level) (37). All of these efforts are characterized by low sensitivity (compared to that of peptides and proteins), by abundant multiple adducts of alkali cations and by partial elimination of the sulfate groups. These features interfere with the unambiguous identification of individual components and with the analysis of heterogeneous mixtures at high sensitivity.

In one attempt to improve the accuracy of mass spectrometric mass determination of heparin fragments, an immobilized cationic surfactant was used to displace, in part, sodium cations from complexes with the analyte (35). The surfactant, triddecylmethyl ammonium chloride (TDMAC), formed complexes with the analyte which somewhat increased sensitivity and resolution. TDMAC, however, is a fixed-charge monobasic ion and, as such, forms a multiplicity of complexes with polyionic analytes in which some labile groups are unprotected by ionic bonding. Thus, fragmentation was observed, meaningful mass estimates were difficult to determine, and samples of analyte in the 25–50 μg range were needed.

SUMMARY OF THE INVENTION

It is one object of the present invention to provide an improved method of measuring the molecular weight of highly polyionic analytes by mass spectrometry. In particular, the present invention provides a method wherein one or more highly polyionic reagents, of opposite charge to the polyionic analytes and of known molecular weight, are allowed to form one or more non-covalent complexes with the analytes. The molecular weight of these complexes may then be determined by standard spectrometric means and the weight of the analyte calculated from the weight of the complexes.

Another object of the present invention is to provide such highly polyionic reagents for use in mass spectrometry with highly polyionic analytes.

The reagents of the present invention may be highly polybasic for use with highly polyacidic analytes, or may be highly polyacidic for use with highly polybasic analytes. The reagents may be polypeptides, derivatives of polypeptides, or molecules which are neither polypeptides nor polypeptide derivatives. In general, the highly polyionic reagents of the present invention are compounds with multiple, highly ionic functional groups attached covalently to a flexible molecular backbone. Preferably, the backbone is substantially or highly flexible.

The reagents of the invention may have molecular weights ranging from about 500 Da to about 200,000 Da but, weights ranging from 1,000 Da to 100,000 Da, or from 2,000 Da to 50,000 may be preferred for some analytes.

When the reagents of the invention are polypeptides or derivatized polypeptides, the reagents may range from in size from about 5 to about 2,000 amino acid residues or derivatized residues. For use with some analytes, such reagents are preferably from 10 to 1,000 or from 20 to 500 residues or derivatized residues.

The highly polyionic reagents of the present invention may have from 3 to 1,000 highly ionic functional groups linked to the molecular backbone. For some analytes, however, reagents having from 10 to 100 highly ionic groups or from 20 to 50 highly ionic groups are preferred.

The reagents of the present invention have highly ionic functional groups which represent at least about 5% of the total weight of the reagent and, for some analytes, preferably at least about 10% or at least about 25%. When the reagent is a highly polybasic polypeptide, or a derivative of a highly polybasic polypeptide, it is preferred that at least about 8% of the residues or derivatized residues are arginine residues or derivatized arginine residues. For some polyacidic analytes, it is preferred that a polybasic polypeptide reagent include at least about 25% or 50% arginine residues or derivatized arginine residues. In addition, when the highly polyionic reagent is a polypeptide or polypeptide derivative, it is preferred that small non-polar amino acid residues or derivatized residues are at least 10% and preferably at least about 20% or 25% of the total residues or derivatized residues.

DEFINITIONS

Figure 1:
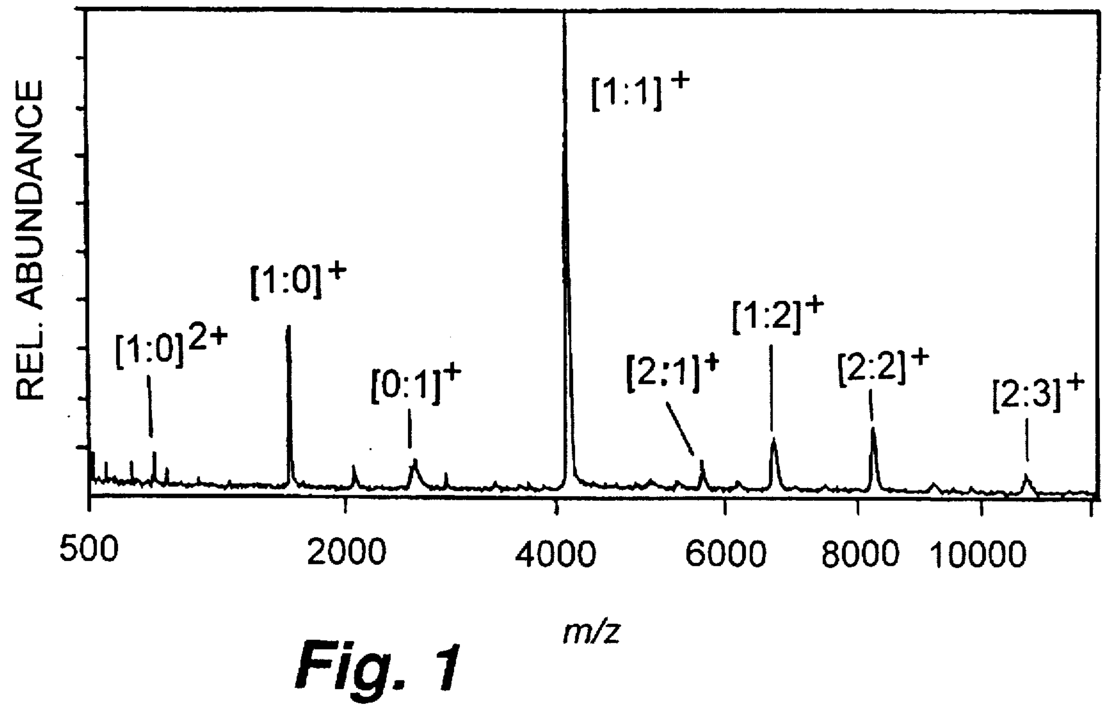
FIG. 1. IR-MALDI mass spectrum of an equimolar mixture of TPKS ($M_r$=1592.7) and $A_{ox}$ ($M_r$=2531.7). Matrix: succinic acid. The spectrum is an average of twenty laser shots. Whereas accurate mass measurement could not be accomplished on the $[0:1]^+$ ion, excellent accuracy (2530.5 Da) was obtained from the $[1:1]^+$ ion of m/z 4124.2

For ease of exposition and to more clearly and distinctly point out the subject matter of the present invention, the following definitions are provided for several specific terms as used herein.

Polyionic. As used herein, the word "polyionic" is intended to mean having more than two ionic groups. That is, having more than two acidic or basic functional groups.

Highly polyionic. As used herein, the phrase "highly polyionic" is intended to mean having more than two highly acidic or highly basic functional groups.

Highly Acidic Functional Group. As used herein, the phrase "highly acidic" is intended to refer to a chemical moiety group for which the proton dissociation constant ($pK_a$) is less than 3.0 and, preferably, less than 2.0. Similarly, by a "highly acidic functional group" is intended a functional molecular group with a $pK_a$ of less than 3.0 and, preferably, less than 2.0.

Highly Basic Functional Group. As used herein, "highly basic" refers to a functional group in which the $pK_a$ is greater than at least 10.5 and, preferably, at least 11.5 or 12.5.

Amino Acid. As used herein, the unmodified phrase "amino acid" is intended to refer to any one of the twenty biologically most common amino acids or to any one of the biologically common amino acid variants as well as to their optical isomers and racemic mixtures thereof. Specifically, by the unmodified phrase "amino acid" is meant not only a levorotatory (L) α-amino α-substituted acetic acid of the type commonly found in biological systems, but also the dextrorotatory (D) enantiomer of such an amino acid, or a mixture of both D and L amino acids. When unmodified, the phrase "amino acids" is not intended to embrace the β-amino propionic acids, amino-butyric acids or any other amino-carboxylic acids. The phrase "α-amino acid," rather than the phrase "amino acid," is used only when confusion between the α-amino acetic acids and other amino-carboxylic acids is likely.

R Group. As used herein, the phrase "R group" is intended to mean the variable group on the α-carbon of a naturally occurring amino acid or an enantiomer of such an R group.

Peptide or Polypeptide. As used herein, the words "peptide" and "polypeptide" are intended to mean molecules comprising a condensation product of a reaction between at least two amino acids as defined above. That is, as used herein, these words are intended to mean molecules in which the carboxylic acid group of one amino acid or one amino acid residue has reacted with the amine group of another amino acid or amino acid residue so as to form a peptide bond. As used herein, "peptide" or "polypeptide" is intended to mean a molecule in which several amino acids, as defined above, have been covalenty joined by several such peptide bonds so as to form a single molecule. Although peptide bonds are amide bonds, the term "peptide bond," as used herein, shall refer to amide bonds linking amino acid residues and not to amide bonds between non-amino acid residues. An amide bond which is not a peptide bond will be referred to herein as a "non-peptide amide bond."

Amino Acid Residue. As used herein, the phrase "amino acid residue" or the word "residue" is intended to mean the portion of an amino acid, as defined above found in a polypeptide after the amino acid has formed peptide bonds at both its amino and carboxylic acid termini. That is, a chemical moiety of formula —NH—CHR—(C=O)— in which R is an R group as defined above.

Small Non-Polar Amino Acids. As used herein, the phrase "small non-polar amino acids" is intended to mean the biologically common amino acids glycine (Gly), alanine (Ala), valine (Val), leucine (Leu), and isoleucine (Ile). As with all references to amino acids herein, these terms are intended to embrace the D and L enantiomers of the small non-polar amino acids as well as mixtures thereof.

Molecular Backbone. As used herein, the phrase "molecular backbone" is intended to mean a chain or series of covalently linked atoms (and the covalent bonds between them) which are common to the covalent linkages between three or more specified functional groups. Thus, for example, the α-carbons and peptide linkages between internal amino acid residues of a polypeptide, as defined above, constitute part of the molecular backbone linking the R groups of the polypeptide. A molecular backbone linking n of the highly ionic functional groups of the present invention will comprise n-1 "segments" in which each segment of the backbone is a part of the backbone linking two adjacent highly ionic functional groups. A segment which does not include a peptide bond, as above, will be referred to herein as a "non-peptide segment."

Side Chain. As used herein the phrase "side chain" is intended to mean any organic group which may be covalently linked to a molecular backbone as defined above. A "side chain" includes, therefore, not only such small moieties as hydrogen atoms, methyl groups, and other lower-alkyl groups, but also larger groups such as the R groups of the amino acids as defined above.

Flexible. As used herein, the word "flexible" is intended to refer to molecular flexibility. A molecular bond is considered flexible if it is a single bond between two atoms and free rotation by those atoms about that bond is not prevented by steric hindrance between other groups covalently attached to those atoms. A segment of a molecular backbone, as defined above, is considered flexible if it includes at least one flexible bond. A "flexible molecular backbone" is a molecular backbone, as defined above, in which a majority of the segments are flexible. A flexible molecular backbone may, of course, include some covalent linkages or segments which would not themselves be considered flexible. That is, a flexible molecular backbone comprising several hundred atoms may include numerous inflexible double bonds or sterically hindered single bonds and yet the molecular backbone as a whole will remain flexible. In general, a flexible molecular backbone is a molecular backbone in which a majority of specified groups (e.g., the highly ionic functional groups of the present invention) are free to rotate with respect to one another about the molecular backbone. In particular, a flexible molecular backbone is one in which at least 50% of the segments comprising that backbone are flexible or capable of free rotation. A molecular backbone is considered substantially flexible if at least 75% of the segments comprising that backbone are flexible and the molecular backbone is considered highly flexible if at least 90% of the segments comprising that backbone are flexible.

End groups. As used herein, the phrase "end groups" is intended to embrace any chemical group which terminates a molecular backbone. Typical end groups include —H, —OH, —$NH_2$, —COOH, and acyl, ester, amide groups and the like. End groups may also include larger moieties such as amino acids which have been covalently linked to the end of the backbone by either their amino or carboxyl groups. In addition, relatively arbitrary moieties (e.g. lipids, sugars) may be linked to and terminate the backbone.

Substantially homogeneous. As used herein, the term "substantially homogeneous," as applied to a reagent, is intended to mean that the reagent is present in a preparation which includes a sufficiently high percentage of the reagent, its isomers and and a sufficiently low percentage of other compounds, such that the other compounds do not substantially degrade the accuracy of mass measurement. Such other compounds may, in fact, be present at significant levels if they are of molecular weights which are well-defined and/or well-removed from the weight of at least one analyte-reagent complex. One of ordinary skill in the art is capable of determining whether a preparation is suitable for use in mass spectrometry without undue experimentation and is capable of determining the sorts of contaminants which are tolerable in a reagent preparation. If the reagent is a compound found in nature in a mixture or combination, a substantially homogeneous preparation will be one which differs from such a mixture or combination in that it has been purified or homogenized so as to remove or degrade compounds which would substantially degrade the accuracy of a spectrometric measurement.

Soft ionization mass spectrometry. As used herein, the term "soft ionization mass spectrometry" is intended to mean mass spectrometry techniques in which the ionization step is accomplished immediately prior to or essentially simultaneously with the vaporization step. "Soft" ionization techniques are known in the art to result in less fragmentation and destruction of the analyte. The term "soft ionization mass spectrometry" is particularly intended to include soft ionization of analytes in mass spectrometry techniques such as fast atom or ion bombardment (FAB) ionization mass spectrometry, electrospray mass spectrometry, plasma desorption mass spectrometry (PDMS), and matrix-assisted laser desorption (MALDI) mass spectrometry. As used hereinafter, the term "mass spectrometry" without further modification is intended to mean "soft ionization mass spectrometry."

DETAILED DESCRIPTION OF THE INVENTION

The present disclosure describes an improved method of mass spectrometric determination of the molecular weight of highly polyionic (i.e. polyacidic or polybasic) compounds. Because of their strong ionic charges, the molecular weight of these compounds has been difficult to measure by standard mass spectrometry. The present invention is a method of determining the molecular weight of such analytes by first complexing them with a polyionic reagent of opposite charge, determining the molecular weight of at least one such complex by mass spectrometry, and then subtracting away the weight of the reagent in the complex (and, if the complex includes a number of analyte moieties, dividing by that number).

The analyte may be either highly polyacidic or highly polybasic. Polyacidic analytes of biological significance include, but are not limited to, oligonucleotides and many glycosaminoglycans. Polybasic analytes of biological significance include, but are not limited to, DNA- and heparin-binding proteins. If the analyte is polyacidic, a polybasic reagent is chosen to form a complex. Conversely, if the analyte is polybasic, a polyacidic reagent is chosen to form a complex. The two cases are conceptually indistinguishable. As there are currently a great number of polyacidic analytes of biological and general scientific interest, however, the examples provided herein are focused on polyacidic analytes and polybasic reagents. In addition, for the sake of brevity of exposition, the discussion below will refer almost exclusively to polyacidic analytes and polybasic reagents without repeatedly reciting that the method is equally applicable to the converse situation. It must be understood, however, that the case of a polybasic analyte and a polyacidic reagent is equally within the spirit and scope of the claims and the invention disclosed herein.

Highly polyacidic analytes, that is, analytes with a multiplicity of strongly or highly acidic functional groups, may be difficult to analyze by mass spectrometry for at least three reasons: (1) they may be difficult to ionize and therefore cause low sensitivity; (2) they tend to form a multiplicity of complexes with varying numbers of small basic moieties such as inorganic cations; and (3) they may be subject to the loss of one or more labile acidic functional groups such as sulfate, sulfonate or phosphate groups during the process of spectrometric mass determination. The last two factors have the effect of creating within a spectrometric sample a variety of closely related complexes which differ one from another in molecular weight only by multiples of the weight of the complexed cations or the lost functional groups. This, in turn, leads to a spectrometric plot with broad or unresolved peaks which makes the true molecular weight of the analyte difficult to determine.

To address these problems, the present invention provides a polybasic reagent of known molecular weight which can form an ionic or non-covalent complex with such an analyte.

The analyte-reagent complexes of the present invention are more easily ionized in a mass spectrometer than the polyionic analytes alone. As a result, the sensitivity of the mass spectrometry is increased. Conversely, the amount or concentration of analyte required is reduced. For example, a 2–3 fold increase in sensitivity may be achieved for disaccharides (Example 5) and increases of about 100 fold (compare, for example, FIG. 7 and FIG. 8), or even 1,000 fold, may be achieved with other highly polyionic analytes (e.g. oligonucleotides or highly polysulfated oligosaccharides). This increase in sensitivity is a primary advantage of the methods and reagents disclosed herein.

A polybasic reagent of the present invention will either form only a single complex with the analyte (with a well-defined spectrometric peak) or will form a small number of complexes (with well-defined spectrometric peaks) which differ one from another in molecular weight by an amount which is sufficiently large so as to allow resolution of the multiple spectrographic peaks. The reagent must be highly polybasic, that is, it must have a multiplicity of strongly or highly basic functional groups so that it will displace smaller cations such alkali metal ions from the type of analyte-cation complexes found in the prior art. Thus, in the prior art, a polyacidic analyte with, for example, seven acidic functional groups might form complexes with anywhere from one to seven inorganic cations such as $Na^+$ or $K^+$. This would cause a broad peak on a spectrometric plot representing the free analyte and each of the seven possible complexes, each of which would differ in molecular weight from the others only by a multiple of the weight of a single cation. The present invention provides a highly polybasic reagent which is chosen to be comparable to the analyte in the number of charged groups. Thus, in the example above, a polybasic reagent would be chosen with preferably seven or more strongly or highly basic functional groups. This reagent could form a complex of one analyte moiety and one reagent moiety and thereby displace any small cations from any complexes they might form with the analyte. This would result in a more resolved peak on the spectrometric plot and a better determination of the molecular weight of the analyte. There may, of course, still be additional complexes in which one or more small cations are included and, therefore, some broadening of the peak but, as the number and/or relative abundance of such complexes is reduced by displacement of the small cations by the highly polybasic reagent, resolution is improved. And, although the reagent may also form complexes with the analyte in which a multiplicity of reagent moieties are complexed with a multiplicity of analyte moieties, these complexes will differ from each other in molecular weight not by multiples of the relatively low weight of a small cation but by multiples of the relatively much higher molecular weights of the entire analyte and/or reagent moieties. Thus, these peaks will be more easily resolved.

The polybasic reagent of the present invention also acts to stabilize the labile acidic functional groups of some polyacidic analytes. For example, sulfate groups which are often lost from such molecules as glycosaminoglycans during mass spectrometry may be stabilized by complex formation with the reagent. Other acidic functional groups such as sulfonate and phosphate groups may also be stabilized in this manner. This decreases the number and/or the relative abundance of complexes in the sample which differ from each other only by multiples of the weight of the lost functional groups and, therefore, improves the determination of the molecular weight of the analyte.

In the following discussion, complex ions are denoted $(mM_B+nM_A+ZH)^z$, where $M_B$, $M_A$ and H refer to the molecular weights of the basic component (whether reagent or analyte), the acidic component (whether analyte or reagent), and a proton, respectively, and m, n and Z refer to their multiplicities. As will be apparent to one of ordinary skill in the art, Z is the ionic charge of the complex. When Z is positive, the mass spectrometer is used in the positive mode. When Z is negative, the mass spectrometer is used in the negative mode. For the sake of brevity, $[m:n]^Z$ will used to describe the composition and charge state of a complex. For example, $[1:0]^+$ for $(M_B+H)^+$; $[0:1]^-$ for $(M_A-H)^-$; $[1:1]^+$ for $(M_B+M_A+H)^+$; $[1:1]^-$ for $(M_B+M_A-H)^-$; $[1:2]^+$ for $(M_B+2M_A+H)^+$; $[1:1]^{2-}$ for $(M_B+M_A-2H)^{2-}$; etc.

An illustrative example is shown in FIG. 1, by the IR-MALDI mass spectrum of an equimolar mixture of the oxidized A-chain of bovine insulin ($A_{OX}$) and tyrosine protein kinase substrate (TPKS, $M_r$=1592.7) in succinic acid as the matrix. As the molecular weights of both of these compounds is known in advance, either may be regarded as the analyte and either may be regarded as the reagent. The $A_{OX}$, however, is a polyacidic peptide which is typically purchased or prepared in a solution which contains inorganic cations which are difficult to remove. While the signal for the acidic component $A_{OX}$, $[0:1]^+$ is low and very broad due to extensive alkali ion attachment, the singly and doubly protonated ions of TPKS, $[1:0]^+$ and $[1:0]^{2+}$ formed sharp peaks and were used for internal calibration of the mass scale. The most abundant ion corresponds to the protonated 1:1 complex, $[1:1]^+$ but a number of higher oligomers, $[1:2]^+$, $[2:1]^+$, $[2:2]^+$, and $[2:3]^+$ are also observed. For the $[1:1]^+$ complex, the mass-to-charge ratio M/Z 4124.2 was obtained in excellent agreement with the calculated value of 4124.4 for the sum of the components.

Assuming, as before, that the analyte is polyacidic and that, therefore, the reagent to be chosen is polybasic, several factors should be considered in choosing the reagent: (1) it should be strongly or highly basic, (2) it preferably has a number of highly basic functional groups that is approximately equal to or larger than the number of acidic functional groups on the analyte (but see Example 7), (3) it should have a molecular weight which is sufficiently high such that multiples of its weight are easily resolved but which, preferably, does not greatly exceed that of the analyte, and (4) it should have a generally flexible molecular structure. These considerations are separately discussed in detail below.

(1) The basic functional groups must be sufficiently basic so as to form strong ionic complexes with the acidic functional groups of the analyte so as to generally displace small cations, typically alkali metal ions, which form multiple complexes with analytes and result in the broad unresolved spectrometric peaks of the prior art. Any non-covalent complex will, of course, be subject to dissociation and, therefore, no polybasic reagent will completely complex with any polyacidic analyte to completely exclude complexes with other cations. A sufficiently basic reagent, however, will form stronger complexes with the analyte and largely displace smaller, less basic cations from such complexes. As a result, greater resolution of the peaks of a mass spectrograph is possible and a better determination of the molecular weight of the analyte is achieved. As described in the examples below, the amine group found on the R group of the amino acid lysine performed relatively poorly as the basic functional group in tests with several polyacidic analytes. Similarly the imidazole group found on the R group of the amino acid histidine also performed poorly. These basic functional groups have dissociation constants ($pK_a$) in the range of 10.2–10.5 for lysine and 6.0–7.0 for histidine. In contrast, as shown in the examples below, when the guanidyl functional group found on the side chain of the amino acid arginine served as the highly basic functional group in polybasic reagents, marked improvement in the resolution of spectrometric peaks was observed. This functional group has a $pK_a$ in the range of 12.5–13.0. Thus, in preferred embodiments, the highly basic functional groups have a $pK_a$ of at least 10.5, more preferably at least 11.5 and most preferably at least 12.5. In addition, in most preferred embodiments, a majority of the highly basic functional groups of a polybasic reagent are guanidyl groups. When choosing functional groups for a polyacidic reagent, the considerations are the same and one of ordinary skill in the art can choose acidic functional groups which are highly acidic in terms of $pK_a$. For example, carboxylic acid groups such as those found on the R groups of the amino acids glutamic acid and aspartic acid are insufficiently acidic but sulfate, sulfonate and phosphate groups are sufficiently acidic to serve as the highly acidic groups of the present invention. In preferred embodiments employing a polyacidic reagent, the highly acidic functional groups have a $pK_a$ less than about 3.0 and, more preferably, less than about 2.0.

(2) The polybasic reagent should be chosen such that it possesses a number of highly basic functional groups which is comparable to or which somewhat exceeds the number of acidic functionalities of the polyacidic analyte. Although the exact number of acidic functional groups on the polyacidic analyte may be unknown (or may vary due to loss of such groups), one of ordinary skill in the art can easily estimate this number by any of a variety of techniques. A polybasic reagent should then be chosen so as to approximately match or somewhat exceed this number. If the number of basic functional groups is too low, the reagent moiety will only complex with a portion of the analyte. As a result, the uncomplexed acidic functional groups of the analyte may complex with small cations such as alkali metal ions and the problems of the prior art will only partly be overcome. However, if the polybasic reagent is relatively large compared to the analyte, uncharged regions of the reagent may shield some acidic groups of the analyte and improve ionization and sensitivity even though the reagent has as few as half as many highly ionic groups (see Example 7). More generally, the spatial distribution of acidic functional groups on an analyte may be such that an equal number of basic functional groups on any given polybasic reagent are sterically incapable of forming ionic complexes with each and, therefore, an excess of basic functional groups may be preferred.

(3) The polybasic reagent should be chosen such that it is of a molecular weight substantially greater than inorganic cations but, preferably, less than the polyacidic analyte. When forming a complex with the analyte, the reagent must be of sufficient molecular weight such that multiples of the weight of the reagent are easily resolved by mass spectrometry. This avoids the problem of the prior art in which relatively small cations form a multiplicity of different complexes with the analyte clustered around the centroid of a broad spectrometric peak. By choosing a reagent with sufficient molecular weight, a $[1:1]^z$ complex will be easily distinguishable from a $[2:1]^z$ complex. On the other hand, the reagent should not be chosen to have a weight which is so high relative to the analyte so as to decrease one's ability to resolve a $[1:1]^z$ complex from a $[1:2]^z$ complex or to render a complex too large for mass spectrometry. In many instances, choosing a polybasic reagent with an appropriate number of highly basic functional groups (as described above) covalently linked to a flexible molecular backbone (as described below) will ensure that its molecular weight is in the appropriate range without further consideration. Naturally, the same considerations apply to the choice of a polyacidic reagent for a polybasic analyte.

(4) The polybasic reagent should be chosen so as to have a generally flexible molecular structure. Because the acidic functional groups of an analyte may be arranged spatially in an unknown manner, and because it is desirable to have a polybasic reagent which can complex with a variety of polyacidic analytes in which the acidic functionalities may be differently arranged in space, the polybasic reagent should be chosen such that it is molecularly flexible and the basic functional groups can move relative to one another to form complexes with acidic functional groups in a variety of spatial patterns. The most obvious way to achieve such a result is to choose or synthesize a polybasic reagent in which the basic functional groups are arranged along a flexible molecular backbone. Thus, the basic functionalities may be covalently linked by flexible side chains to a longer flexible backbone. The side chains and backbone may, for example, simply comprise a chain of methylene groups. Such a structure would allow great flexibility because of the free rotation around the single carbon-carbon bonds of the side chains and backbone. Flexibility could be increased or decreased simply by adding or subtracting methylene groups from the side chains or backbone. As will be obvious to one of ordinary skill in the art, an enormous variety of such side chain and backbone structures may be employed in accordance with the present invention. The side chains or backbone may include atoms other than carbon and hydrogen (e.g., N, O, S, P) and may include a significant percentage of double bonds or even ring structures (although these will decrease flexibility).

In one preferred embodiment of the present invention, the polybasic reagents are synthesized from amino acids. This preference derives, in large part, from the commercial availability and well-developed literature regarding peptide synthesis. The invention is not, however, limited to reagents comprising polypeptides or polypeptide derivatives but rather, to highly polyionic reagents as described and delimited more fully below.

The alpha amino acid arginine (Arg) comprises a strongly or highly basic guanidyl functional group covalently joined by three methylene groups to the α-carbon. This amino acid, therefore, can provide the strongly or highly basic functional groups required by the present invention. As noted above, the amine group on the side chain of lysine (Lys) and the imidazole group on the side chain of histidine (His) are not sufficiently highly basic. Thus, although these residues may be included in the reagent of the present invention, it is recommended that they constitute only a relatively low molar percentage of the total number of residues and that Arg residues provide the highly basic functional groups required for complex formation.

By standard peptide synthesis, a series of Arg residues may be joined into a peptide in which the peptide linkages and α-carbons form a flexible molecular backbone. To achieve greater flexibility and to separate the highly basic guanidyl groups of Arg, the Arg residues can be interspersed with other amino acid residues and, in particular, those with "small non-polar" side groups such as glycine (Gly), alanine (Ala), valine (Val), leucine (Leu) and isoleucine (Ile). (Note that for purposes of this disclosure, Gly is considered a "small non-polar" residue although it is frequently considered polar.) Preferably, the larger and less flexible non-polar amino acid residues (proline (Pro), methionine (Met), phenylalanine (Phe), tyrosine (Tyr), and tryptophan (Trp)) are not included or are included at a low molar percentage because they can cause steric hindrance and limit the flexibility of the reagent. Similarly, the polar amino acids (serine (Ser), threonine (Thr), cysteine (Cys), asparagine (Asp) and glutamine (Gln)) are not preferred because their polarity, in addition to the polarity of the basic functional groups, may create a reagent which is too polar for some applications. Nonetheless, they may be included as a small molar percentage of the entire reagent. For a polybasic reagent, the inclusion of the acidic amino acid residues (aspartic acid (Asp) and glutamic acid (Glu)) is, of course, not recommended but they may be included in low molar percentages (preferably less than 10% and, more preferably, less than 5%).

When a polypeptide is employed as the polybasic reagent, the number of highly basic functional groups and the molecular weight of the reagent can be easily manipulated by varying the number of Arg residues and the number of total residues in the polypeptide.

The present invention contemplates a polypeptide of no fewer than 5 and no more than 2,000 amino acid residues as a polybasic reagent and, preferably, no fewer than 10, 20, or 50 residues. Thus, the present invention contemplates a polybasic polypeptide of a molecular weight of no less than about 500 Da and no more than 200,000 Da and, preferably, no less than 1,000, 2,000 or 5,000 Da. This size range is intended to correspond to polybasic reagents useful for forming complexes with relatively small polyacidic analytes such as small oligosaccharides and relatively large polyacidic analytes such as polynucleotides comprising several hundred nucleotides. For a large polyacidic analyte with widely spaced acidic functional groups, only a few highly basic functional groups are needed and, therefore, a lower limit of 5% arginine residues (by molar volume and not molecular weight) is appropriate. For smaller polyacidic analytes with a greater number of acidic functional groups, an upper bound of 75% arginine residues is generally appropriate although poly-Arg peptides will have (diminished) utility in accordance with the present invention.

In most preferred embodiments in which the polybasic reagent is a polypeptide, the peptide is between 10 and 1,000 or between 20 and 500 residues and is between 25% and 70% arginine.

When a polypeptide is employed as the polybasic reagent of the present invention, it is preferable that a substantial percentage of the residues be chosen from the small non-polar residues (Gly, Ala, Val, Leu and Ile). In preferred embodiments, at least 10%, and more preferably at least 20% or 25%, of the residues are chosen from the small non-polar residues.

In one preferred embodiment, a polybasic reagent comprises a polypeptide in which at least half of the residues are Arg and in which no more than one non-Arg residue separates any Arg residue from the next Arg residue. This embodiment can be expressed by the formula X—(Arg—$S_i$)n—Y where n is an integer from 3 to 1,000; i is an integer from 1 to n; each $S_i$ is a functional group independently chosen from the group consisting of the amino acid residues; X and Y are end groups and the polypeptide comprises at least 5 amino acid residues. Note that either X or Y may represent the amino terminus of the polypeptide.

In a preferred embodiment, the residues $S_i$ are chosen such that at least 10% and, more preferably, 20% or 25% of the total residues are chosen from the group consisting of the small non-polar residues.

In another preferred embodiment, the residues $S_i$ are chosen from the group consisting only of Arg and the small non-polar residues.

For ease of synthesis, the polybasic reagent may include a repeating pattern of subunits. Thus, in one preferred embodiment, the polybasic reagent is represented by the formula X—$(Arg—S)_n$—Y where n is an integer from 3 to 1,000; S is chosen from the group consisting of the small non-polar residues; X and Y are end groups, and the polypeptide comprises at least 5 amino acid residues. In most preferred embodiments, the polybasic reagent is X—$(Arg—Gly)_n$—Y or X—$(Arg—Ala)_n$—Y and n is at least 5 and more preferably at least about 10, 50 or 250.

Similarly, larger repeating units may be chosen such as X—$(Arg—Gly—Gly)_n$—Y, X—(Arg—Gly—Arg—$Ala)_n$—Y with the minimum and maximum values of n appropriately increased or reduced so that the polypeptide comprises at least 5 residues and does not exceed 2000 residues.

In a more general preferred embodiment, a polybasic reagent comprises a polypeptide of formula X—($S_1$—. . . —$S_i$—Arg—$S_{i+2}$—. . . $S_j)_n$—Y; where n is an integer from 3 to the integer nearest to 2000/j; i is an integer from 1 to 18; j is an integer from (i +2) to 20; each $S_i$ and each $S_j$ is independently chosen from the group consisting of the amino acid residues; X and Y are end groups; and the polypeptide comprises at least 5 residues. In this embodiment, at least 5% of the residues are Arg residues.

In a more preferred embodiment, i is an integer from 1 to 8 and j is an integer from (i+2) to 10. In this embodiment, Arg represents at least 10% of the total residues. In most preferred embodiments, i and j are appropriately adjusted such that Arg represents at least 20%, 30%, 40%, 50%, 60% and 70% of the total residues.

In a preferred embodiment, the residues $S_i$ and $S_j$ are chosen such that at least 10% and, more preferably, 20% or 25% of the total residues are chosen from the group consisting of the small non-polar residues.

In another preferred embodiment, the residues $S_i$ are chosen from the group consisting only of Arg and the small non-polar residues.

In very specific preferred embodiments of the present invention, highly polybasic reagents are provided which correspond to SP-1, SP-2, SP-3, SP-4 and SP-5 of Table I.

As will be readily apparent to one of ordinary skill in the art, the above embodiments embrace highly polybasic polypeptides in which each arginine residue is separated from the next Arg by at most one, two or up to nineteen non-arginine residues such that the polybasic polypeptide is at least 50%, 33% or 5% Arg, respectively. And, in the most preferred embodiments, the polybasic reagent comprises an arginine-rich polypeptide in which the remaining residues include a significant percentage (at least 10% and preferably 20% or 25%) of small non-polar residues which will provide a flexible molecular backbone connecting these arginine residues. These polybasic reagents are, therefore, exemplary of the general teaching of the present disclosure which teaches a polybasic reagent comprising a multiplicity of highly basic functional groups (in this case, the guanidyl groups of arginine residues) covalently linked to a flexible molecular backbone (in this case a polypeptide backbone).

It will also be readily apparent to those of ordinary skill in the art that departures from the above-described preferred embodiments may still possess the utility of the present invention. As an example, the inclusion of an amino acid which is not in the group consisting of Arg and the small non-polar residues will not seriously affect the utility of a polybasic polypeptide of, for example, twenty residues. Indeed, the inclusion of many such residues may be acceptable in a polybasic polypeptide of several hundred residues. Anyone of ordinary skill in the art can, by mere inspection of the primary sequence of a polypeptide or by the standard mass spectrometry experiments described herein, determine whether a polybasic peptide is an appropriate reagent for the present invention without undue experimentation.

As noted in the definitions above, the amino acids of these embodiments may be the D or L enantiomers or a mixture thereof.

Furthermore, as noted above, the polybasic reagents of the present invention need not be polypeptides at all. Indeed, although polypeptides have advantages in being readily available commercially and being the subject of a great volume of scientific literature, they have disadvantages to an industrial manufacturer or a consumer disinterested in their biological activity. In particular, peptide bonds (which are amide bonds) are subject to hydrolysis in solution to such an extent that they are generally stored, sold and shipped in a lyophilized state. Thus, whereas the peptide bonds of commercially available polypeptides or the potential for forming peptide bonds between commercially available amino acids or peptides may be of great import to a biochemist or molecular biologist, they are of less concern in the present invention. And, although polybasic peptides may be preferred by some users of the present invention, less labile polybasic reagents are preferred for more frequent or higher quantity users. These non-polypeptide polybasic reagents, partly described above, are more fully disclosed below.

In one preferred embodiment of the present invention, the polyionic reagent is first synthesized as a polypeptide and this polypeptide is derivatized by in vitro chemical reactions to produce a polybasic reagent which is more highly polybasic and/or more stable than the original polypeptide.

As noted above, for example, the peptide bonds of polypeptides are amide bonds which are subject to hydrolysis in solution. Thus, in one preferred embodiment, the carbonyl groups of the amide linkages in the molecular backbone are reduced to form methylene groups and, thereby, the polypeptide or polyamide is derivatized to form a polyamine which is less subject to hydrolysis. Although conversion of the polypeptide to a polyamine by reducing the peptide bonds is one convenient means of increasing the stability of the backbone of the reagent, one of ordinary skill in the art can choose from any of a variety of standard chemical reactions which will achieve that end.

Alternatively, the R groups which are covalently linked to the α-carbons of amino acids, and which distinguish the amino acids from each other, may be derivatized to add highly ionic functional groups. Such derivatization may be used to convert one amino acid R group into another or may be used to create a "derivatized residue" with an R group which differs from any of the R groups of the twenty amino acids most common in nature. The amine group of the R group of lysine, for example, can be converted to a highly basic functional group such as a guanidyl or N-substituted guanidyl group. The result is a derivatized residue which differs from arginine by the inclusion of one additional methylene group between the guanidyl group and the α-carbon. When the polyionic reagent is a polybasic reagent, such derivatization is preferably used to add or create highly basic functional groups with $pK_a>10.5$ and, more preferably, >11.5 or even 12.5. In most preferred embodiments, the highly basic functional group is a guandidyl or N-substituted guanidyl group. When the polyionic reagent is a polyacidic reagent, such derivatization is particularly preferred because the acidic functional groups of the R groups of the acidic amino acids (aspartic acid (Asp) and glutamic acid (Glu)) may not be sufficiently highly acidic for some applications. In a most preferred embodiment employing a polyacidic reagent, a polypeptide is derivatized so as to add sulfate, sulfonate and/or phosphate groups to the side chains of the polypeptide. More generally, in preferred embodiments acidic functional groups with a $pK_a<3$ or, more preferably <2, are employed in polyacidic reagents.

Functional groups may also be removed from a polypeptide by chemical reaction. For example, a polypeptide intended for use as a polybasic reagent may still include one or more acidic amino acid residues. Derivatization of such a polypeptide may be used to convert the acidic residues to basic or neutral residues or may be used to produce a derivatized residue with an R group that is not found in the R groups of the common amino acids. Similarly, larger or sterically bulky R groups, such as the R groups of Phe, Tyr and Trp, or sterically inflexible R groups, such as the R group of proline (Pro), may decrease the flexibility of a reagent and, therefore, these may also be removed or converted to less bulky or more flexible R groups or side chains.

As used herein, therefore, derivatization refers to (1) the chemical modification of the backbone of a polypeptide so as to increase its stability and/or to (2) the chemical modification of the R groups of a polypeptide so as to add or remove highly ionic functional groups and/or the chemical modification of the R groups of a polypeptide so as to remove large or inflexible R groups which decrease the flexibility of the molecular backbone of the reagent.

One of ordinary skill in the art may accomplish such derivatization by any of a wide variety of chemical reactions, including reactions involving protecting groups. Such reactions and protocols for such reactions are well known in the art and can be found in standard reference books in the art (see, for example, R. C. Larock, (1989) Comprehensive Organic Transformation: A Guide to Functional Group Preparation, (VCH Publishers, Inc., New York)). In light of the teaching of the present disclosure, therefore, one of ordinary skill in the art can produce highly polyionic reagents which are derivatized polypeptides.

In other preferred embodiments of the present invention, the highly polyionic reagent is neither a polypeptide nor a derivative of a polypeptide. As noted above, the present invention requires only that the polyionic reagent have a multiplicity of highly ionic (i.e. highly acidic or highly basic) functional groups covalently joined to a flexible molecular backbone. The reagents of the present invention may, therefore, be synthesized from a great variety of compounds which will provide a flexible molecular backbone and to which highly ionic groups may be attached.

As an example, the β-amino propionic acid analogues of the α-amino acids (with the R groups of the common α-amino acids covalently linked to the α- or β-carbon) may be used just as easily as the α-amino acids to form polypeptide-like molecules. The molecular backbone of such a β-amino propionic acid "polypeptide" would differ from the backbone of an α-amino acid polypeptide simply by the inclusion of an additional methylene group in each "residue." Indeed, the use of β-amino propionic acids would have the advantage of creating a longer and therefore more flexible backbone (although they are likely to be less available commercially). Similarly, butyric and even longer chain amino-carboxylic acid analogues may be employed and mixed polymers including the common α-amino acids interspersed with propionic, butyric and other amino-carboxylic acids can be produced. As with the α-amino acid polypeptides, these polymers could also be derivatized to enhance the stability of the molecular backbone and to add, subtract or modify R groups.

Furthermore, although the above examples all include polyamide (or polyamine) polymers formed by condensation reactions of straight-chain amino-carboxylic acids (and, optionally, derivatization of the backbone), the highly polyionic reagents of the present invention need not include amide or amine bonds in the flexible molecular backbone and need not comprise polymers.

Thus, in a most general sense, the highly polyionic reagents of the present invention have the following general structure:

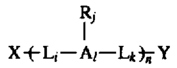

where n is an integer from 3 to 1,000 (reflecting the fact that polyionic reagents with fewer than 3 or more than 1,000 highly ionic functional groups are not contemplated); $A_1$ are atoms or groups of the backbone to which the side chains $R_j$ are attached; $L_i$ and $L_k$ are generally flexible molecular linkers which, along with the atoms or groups $A_1$, form the flexible molecular backbone of the reagent; $R_j$ is a side chain including a highly ionic functional group; i, j and k range from 1 to n; and X and Y are end groups. The atoms or groups $A_1$ are elements of the molecular backbone from which the side chains, $R_j$, branch off. Generally, any atom or groups which may serve this purpose may be used but the atom or group chosen should not result in a labile linkage to $R_j$, $L_i$ or $L_k$. In preferred embodiments, the group $A_1$ is chosen from the group consisting of

In most preferred embodiments, $A_1$ is either

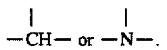

In a preferred embodiment, each $L_i$ and each $L_k$ is simply an alkyl chain of 1 to 13 methylene groups ending either in a methylene group, an amine group, a carbonyl group or an amide group. If, for example, each $L_i$ and each $L_k$ consists of a single methylene group, the spacing of the highly ionic groups, $R_j$ will approximate the spacing of the R groups of adjacent amino acids. Similarly, if each $L_i$ and each $L_k$ consists of 4, 7, 10 or 13 methylene groups, the spacing of the highly ionic groups, $R_j$, will approximate the distance between the R groups of amino acids separated by 2, 4, 6 or 8 residues in a polypeptide chain. The linkers, $L_i$ and $L_k$ may, of course, be longer. In general, the linkers should, however, be of sufficient length to provide for a flexible molecular backbone without needlessly increasing the molecular weight of the polyionic reagent. Thus, for example, linkers of 50 or even 100 methylene groups are tolerable in an otherwise relatively large reagent, but are not recommended for polyionic reagents intended to complex with relatively small analytes.

In addition, the linkers $L_i$ and $L_k$ may include substituted methylene groups (e.g., alkylated or halogenated methylenes or methylenes linked to larger functional groups such as the side chains of amino acids) or may include double bonds (but these are not preferred as they decrease the flexibility of the backbone of the reagent). Furthermore, the linkers $L_i$ and $L_k$ may include heteroatoms (e.g., N, O, S and P) and functional groups such as carbonyl groups. Indeed, heteroatoms are expected to be included in the linkers or backbone because they are found in many functional groups which facilitate chemical synthesis. For example, as seen in polypeptide synthesis, terminal amine groups may be reacted with terminal carboxylic acid groups to form amide bonds. Similarly, these and other heteroatom groups may be included in the linkers and/or resultant molecular backbone of the present embodiment.

Preferably, the molecular backbone of the present embodiment includes few or no labile bonds and, as was seen in the reduction of polypeptides (i.e. polyamides) to polyamines, any such labile groups are preferably derivatized to increase the stability of the molecular backbone to hydrolysis or other degradation.

The side chains, $R_j$, of the highly polyionic reagents described above, are generally of the formula $—L_j—I_j$ where $L_j$ is an optional linker and $I_j$ is a highly ionic functional group. The linker $L_j$ is subject to the same constraints and considerations as the linkers $L_i$ and $L_k$. The highly ionic functional group $R_j$ is a highly basic functional group (e.g., a guanidyl group) for polybasic reagents and a highly acidic group (e.g., a sulfate, sulfonate, or phosphate group) for polyacid reagents.

In general, then, the linkers $L_i$, $L_j$ and $L_k$ may include from 0 to 100 covalently linked groups including, but not limited to, $—CH_2—$, $—CHZ_1—$, $—CZ_1Z_2—$, $—CH{=}CH—$, $—CH{=}CZ_1—$, $—CZ_1{=}CZ_2—$, $—(C{=}O)—$, $—O—$, $—S—$ and $—NH—$. Here, $Z_1$ and $Z_2$ represent substitution groups such as acyl, aryl, cyclic, halogen, hydroxyl, amino and R groups.

In preferred embodiments, the linkers are, on average, of a length equivalent to about 1 to 20, and more preferably 1 to 13 or 1 to 7, methylene groups. In most preferred embodiments, the linkers $L_i$ and $L_k$ have structures $—(CH_2)_x—$, $—(CH_2)_x—NH—$, or $—(CH_2)_x—(C{=}O)—$ where x is an integer from 0 to 100 which varies independently from linker to linker but which, preferable, averages to about 7 to 13 over all linkers. The linker $L_j$ is preferably of structure $—(CH_2)_x—$ where x is an integer from 0 to 100 but, preferably, is between 1 to 13 or 1 to 7.

In one preferred embodiment in which the reagent is highly polybasic, the highly basic groups are guanidyl or N-substituted guanidyl groups which are attached to the flexible molecular backbone in a predetermined and repeating pattern and in which at least some of the adjacent guanidyl groups are separated from each other by a distance greater than that between the guanidyl groups in immediately adjacent Arg residues in a polypeptide.

The correspondence between the above-described "non-polypeptide" highly polyionic reagents and the previously described highly polyionic polypeptides will be clear to one of ordinary skill in the art. Indeed, the description of the "non-polypeptide" highly polyionic reagent embraces such polypeptide reagents. Nonetheless, in designing such a reagent, the advantages of highly polyionic polypeptides (e.g., commercial availability of the reactants, ease of synthesis, flexible molecular backbone) should be retained while the disadvantages (e.g., instability of amide bonds) should be avoided.

The highly polyionic reagents of the present invention comprise a multiplicity of highly ionic functional groups covalently linked to a flexible molecular backbone. Because the molecular backbone serves primarily to stably and flexibly link the highly ionic functional groups, the distinguishing features of the reagents of the present invention are, perhaps, best described by (1) the "density" of the highly ionic functional groups of the reagent, (2) the nature of the highly ionic groups, (3) the flexibility of the backbone, and (due to the practical limitations of mass spectrometry) (4) the molecular weight and net ionic charges of the reagents. These considerations are discussed in sequence below.

(1) The "density" referred to above is most easily described, given the variable lengths of the linkers $L_i$, $Lj$ and $L_k$, as a percentage of molecular weight of a polyionic reagent contributed by the highly ionic functional groups. Thus, in one preferred embodiment, the highly ionic functional groups comprise at least 5% of the molecular weight of a highly polyionic reagent and, in most preferred embodiments, the highly ionic functional groups comprise at least about 10%, 20% or 25% of the total molecular weight of the reagent.

As will be clear to one of ordinary skill in the art, however, one can easily defeat such a limitation by adding an arbitrarily large end group or linker simply to drive up the molecular weight of the reagent and, therefore, to drive down the percentage of molecular weight contributed by the highly ionic groups. An exceedingly long linker, for example, can simply "loop out" of the tertiary and quaternary structure of the analyte-reagent complex and will serve merely to increase molecular weight. Such linkers or end groups, lacking in functional or structural justification, will be seen to fall within the spirit of the claims and teachings of the present invention.

(2) The highly ionic functional groups of the present invention should be chosen as defined herein. Thus, for polybasic reagents, the highly basic functional groups should have $pK_a$ greater than at least 10.5, preferably greater than 11.5 and, most preferably, greater than 12.5. In preferred specific embodiments, the highly basic functional groups are guanidyl or N-substituted guanidyl (e.g. alkylated) groups. Similarly, for polyacidic reagents, the highly acidic functional groups should have $pK_a$ less than about 3.0 and preferably less than 2.0. In preferred specific embodiments, the highly acidic groups are sulfate, sulfonate or phosphate groups.

(3) The molecular backbone of the present invention should be generally flexible as defined herein. That is, at least about 50% of the backbone segments should be flexible and, preferably, at least 75% or 90% should be flexible. Obviously, in the most preferred embodiments, all of the molecular backbone segments are flexible.

(4) Because of practical limitations of mass spectrometry (as the art is currently developed), the range of molecular weights of compounds amenable to this process is limited. As a consequence, the net ionic charge of such compounds are also limited. Thus, the polyionic reagents of the present invention are contemplated to have molecular weights only in the range of about 500 Da to about 200,000 Da and, preferably in a range of about 1,000 Da to about 100,000 Da or from about 2,000 to about 50,000. Similarly, the polyionic reagents are contemplated to have between about 3 to 1,000 highly ionic functional groups and preferably between 10 and 100 or between 20 and 50.

Once an appropriate polybasic reagent is chosen, the polyacidic analyte and polybasic reagent are mixed in a solution to allow formation of analyte-reagent non-covalent complexes. This solution may provide the sample for mass spectrometry by itself. In other embodiments, the solution may contain additional compounds which facilitate mass spectrometry or which are evaporated or allowed to evaporate such that a solid sample including analyte-reagent complexes is produced. In particular, the solution may contain matrix-forming compounds in a solvent such that, upon evaporation of the solvent, a solid matrix including analyte-reagent complexes is produced. Such matrix-forming compounds and solvents are well known to those of ordinary skill in the art and several specific matrix-forming compounds are disclosed in the examples below. The production of such samples, choice of such solvents, and choice of such matrix-forming compounds are well within the ability and knowledge of one of ordinary skill in the art and need not be reiterated here. Solvents and matrix-forming compounds which provide the best known mode of practicing the present invention in conjunction with MALDI are disclosed in the examples below.

According to the present invention, a mass spectrometry sample including complexes of polybasic analytes and polybasic reagents is subjected to mass spectrometric analysis according to standard techniques. The resultant mass spectrometry plot (or spectrum) will include at least one major peak corresponding to a complex $(mM_B+nM_A+ZH)^z$ as described above. Because, in the case of a polybasic reagent and a polyacidic analyte, the value of $M_B$ is known with a high degree of certainty and the value of $M_A$ will be known with some degree of certainty, the values of m and n can be unambiguously determined for at least one peak. Therefore, from the centroid, X, of any such peak, the value of the unknown, $M_A$, can be determined by solving $X=(mM_B+nM_A+ZH)$ for the variable $M_A$. The advantages of the present invention lie precisely in the increased ease of ionization and consequently increased sensitivity; the higher resolution of peaks (allowing X to be more precisely ascertained); and the separation of multiple peaks by substantial and recognizable multiples of $M_B$ (allowing m and n to be unambiguously ascertained).

As will be clear to one of skill in the art, more than one of the reagents of the present invention may be used in a single sample. If, for example, the sample includes a variety of analytes of unknown mass, a combination of two or more reagents may be used in which one reagent is larger and/or more highly charged than the other. When the sample includes, for example, a mixture of oligonucleotides or oligosaccharides of varying lengths, a smaller polybasic reagent may be used in conjunction with a larger polybasic reagent so that the smaller reagent and analytes may form complexes and the larger reagent and analytes may form complexes. The two reagents should, however, be chosen such that they differ sufficiently in mass to allow for unambiguous identification of the various peaks in a spectrum.

The following examples are provided to illustrate specific instances of the practice of the present invention in one laboratory and are not to be construed as limiting the present invention to these examples. As will be apparent to one of ordinary skill in the art, the present invention will find application in a variety of mass spectrometric techniques in which the analyte is highly polyionic. In particular, as will be readily apparent to one of ordinary skill in the art, the methods and products of the present invention are not limited to polyacidic analytes or to MALDI mass spectrometry. Rather, they are applicable to any mass spectrometry in which it may be necessary to ionize a highly polyionic analyte.

MATERIALS AND METHODS

The experiments in the examples provided herein all employed matrix-assisted laser desorption ionization mass spectrometry (MALDI). The MALDI experiments were carried out on a modified VT2000 (Vestec Corp., Houston, Tex.) linear time-of-flight mass spectrometer previously described (13). Two laser sources were used in this study: a $N_2$ laser radiating at 337 nm wavelength with 3 ns pulses (Laser Science, Newton, Mass.) for ultraviolet experiments (UV-MALDI), and an Er:YAG laser (Schwartz Electro-Optics Inc., Orlando, Fla.) with 2.94 μm wavelength and 120–140 ns pulses for infrared experiments (IR-MALDI).

The ions generated by the laser pulses were accelerated typically to 30 keV energy. A stainless steel electrostatic particle guide (0.5 mm diameter) was installed along the axis of a two meter long drift tube in order to improve ion transmission (14). The guide wire was appropriately pulsed in order to protect the detector from overload due to the abundant low-mass matrix ions. As reported by Brown et al. (15), the use of the particle guide not only increases sensitivity, but also increases the mass resolution. Under optimum conditions, a resolution of 1000 (at FWHM) was obtained at M/Z 5734.5 (bovine insulin).

Ions were detected with a 20-stage discrete dynode electron multiplier, or with a hybrid detector consisting of a microchannel plate and a discrete dynode electron multiplier. The detector signal was preamplified and digitized by a digitizing oscilloscope (LeCroy, Chestnut Ridge, N.Y.) at a rate of 400 or 200 MHz depending upon the time-of-flight range covered by the measurement. The software for data acquisition and processing was run on an IBM PC and a Local Area VAXcluster. It allowed programming of the oscilloscope for automatic averaging of a number (approximately 30–50) of individual mass spectra for UV-MALDI, or for interactive averaging allowing the operator to include a spectrum in the average or to discard it on a one-by-one basis for IR-MALDI. The former operation is well suited to UV-MALDI experiments where the shot-to-shot variation of the mass spectra is reasonably low. Interactive averaging, however, is almost a necessity with IR-MALDI where the considerable shot-to-shot variation of the mass spectra and the higher consumption rate of the sample (16) usually require an economic method of data acquisition.

For MALDI, the analyte has to be embedded in a large excess of well-absorbing matrix molecules which are generally small, solid organic acids. Over twenty matrix compounds were tested in the complex formation experiments. Proper selection of the matrix for successful MALDI analysis is often crucial. The matrix mediates the transfer of laser energy to the analyte by desorbing and ionizing it without instantaneous fragmentation of the analyte. In the experiments described herein, the matrix also has to promote the formation of the analyte-reagent complex. Complex generation in MALDI is a property of only few matrix compounds. The most efficient matrices were sinapinic acid, caffeic acid, anthranilic acid and 3-hydroxypicolinic acid in the UV; and succinic acid and 5-(trifluoromethyl)uracil (TFMU) in the IR. Only four of these were particularly useful for the analysis of heparin-derived oligosaccharides through ionic complexes. Infrared MALDI was very useful in the detection of disaccharides with 5-(trifluoromethyl)uracil (TFMU) as matrix. Three UV MALDI matrices were also used: sinapinic acid, caffeic acid, and 3-hydroxypicolinic acid. 5-(Trifluoromethyl)uracil was dissolved in 1:1 water-acetonitrile (ACN) mixture at 10–12 g/l concentration. Sinapinic acid and caffeic acid were used in 10 g/l concentration, the former in 2:1, the latter in 1:1 water-ACN as the solvent. 3-hydroxypicolinic acid was used at a 25 g/l level in 1:1 water-ACN. Succinic acid was dissolved in pure water at a concentration of approximately 10g/l. Addition of about 10 w/w% D-fucose to sinapinic acid and 3-hydroxypicolinic acid slightly improved spectrum quality. Fresh matrix solutions were prepared every week, only sinapinic acid had to be prepared daily due to its photosensitivity. All the matrix compounds were purchased from Aldrich Chemical Co., Inc. (Milwaukee, Wis.) and were used without further purification.

Synthetic peptides SP-1, SP-2, SP-4 and SP-5 were prepared in the Biopolymer Laboratory at MIT. Peptide "SP-3" was provided by T. Curran (Roche Institute of Mol. Biology, Nutley, N.J.) and histone H4 from calf thymus was purchased from Boehringer Mannheim Corp. (Indianapolis, Ind.). All of the other peptides were purchased from Sigma Chemical Co. (St. Louis, Mo.) and were used without further purification. Phosphated and sulfated compounds were used as the acidic components. Oligonucleotides were synthesized at MIT, a heparin-derived hexasaccharide was obtained from D. J. Tyrrell (Glycomed Inc., Alameda, Calf.), and suramin was provided by W. C. Herlihy (Glycan Pharmaceuticals, Cambridge, Mass.). The sulfated compounds were provided as sodium or ammonium salts. Initially, cation exchanger beads (AG 50W-X8, Bio-Rad Laboratories, Richmond, Calif.) were used to convert the salts into free acids. This was found not to be generally necessary, however, and the salts were used in most of the later experiments. In most cases, the basic and acidic components were mixed in 1:1 molar ratio and diluted with the matrix solution. The final analyte concentrations were between 0.1–10.0 pmol/μl. A volume of 0.5–1.0 μl sample solution was placed on the probe tip, and dried with the assistance of an airstream.

Heparin-derived oligosaccharides and basic peptides/proteins were usually mixed in the presence of the matrix in equimolar proportions. For unknown reasons, when the components were mixed in advance as aqueous solutions and the matrix was added later, a considerably lower degree of complex formation was observed. The sample solution contained the components at 0.5–10 pmol/μl level (although an order of magnitude less could still be used). Of the final solution, 0.5–1 μl was put on the probe surface and dried with the assistance of a stream of air.

EXAMPLE 1

Application to polypeptides as the polyacidic analytes. Ionic complexes can be observed upon either UV or IR irradiation. Their abundance in MALDI mass spectra depends on three parameters: the basic component, the acidic component, and the matrix. The effectiveness of the basic components was evaluated based on the relative abundance ratio $[1:1]^+/[1:0]^+$ for $A_{OX}$ as the acidic component and sinapinic acid as the matrix. Basic peptides and proteins tested are compiled in Table I. In addition to naturally occurring polypeptides, several synthetic peptides of high arginine content have also been tested. The data (not shown) obtained with TPKS, renin substrate residues 1–13 and β-endorphin indicate that complex formation (i.e., relatively more abundant $[1:1]^+$ ion) appears to be dependent on increasing numbers of arginines but is not affected by the number of the less basic lysines and histidines present. For example, no complex of $A_{OX}$ was observed with β-endorphin which contains five lysines but no arginine. The significance of the number of arginines is also related to the size of (and Arg distribution within) the protein: moderate complexing between histone H4 and $A_{OX}$ was observed, whereas the less basic growth hormone releasing factor was more effective. For larger peptides and proteins, their tertiary structure seems to play a significant part.

The number of acidic sites and their $pK_a$ value are equally important for the acidic counterpart, $M_A$. Whereas the oxidized A-chain of bovine insulin, $A_{OX}$, complexes readily, the oxidized B-chain (two cysteic acids within the 30 amino acid residue peptide, $M_r$=3495.9) produces hardly any complex ions and pancreastatin [37–52] with five glutamic acids located at the N-terminus of this hexadecapeptide ($M_r$=1820.0) forms no complexes at all, even with the most basic peptides. Complex formation is most important with highly sulfated, sulfonated, and phosphorylated compounds.

Figure 2A:
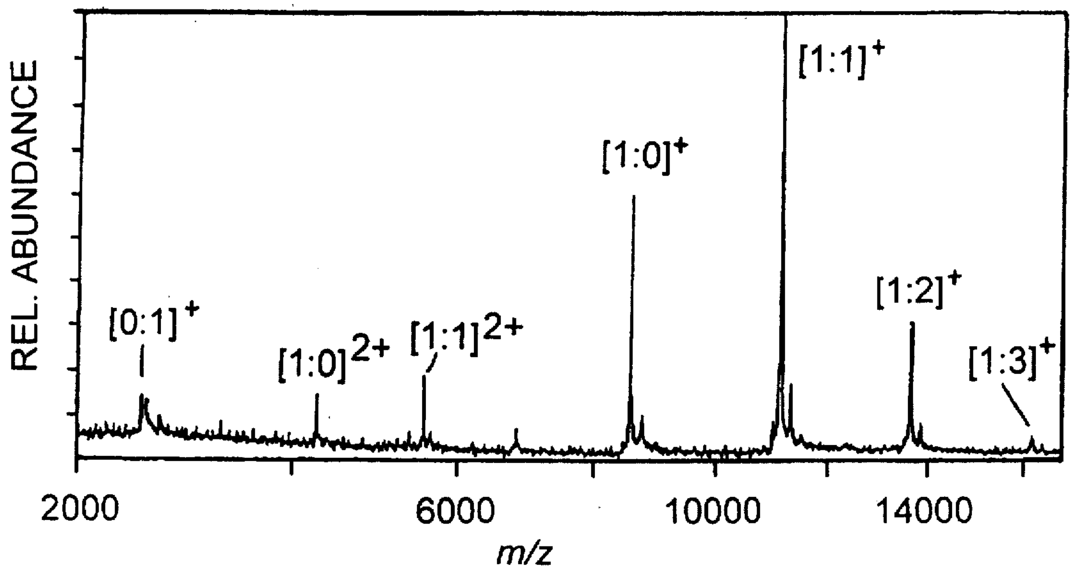
FIG. 2. MALDI mass spectra of an equimolar mixture of bovine ubiquitin ($M_r$=8564.9) and $A_{OX}$. Wavelength: 337 nm. A. Matrix: sinapinic acid. The small satellite peaks visible for the more abundant ions are photoadducts of the matrix, B. Matrix: α-cyano-4-hydroxycinnamic acid. The arrow points to the position where the $(M+H)^+$ ion of $A_{OX}$ would be expected.
Figure 2B:
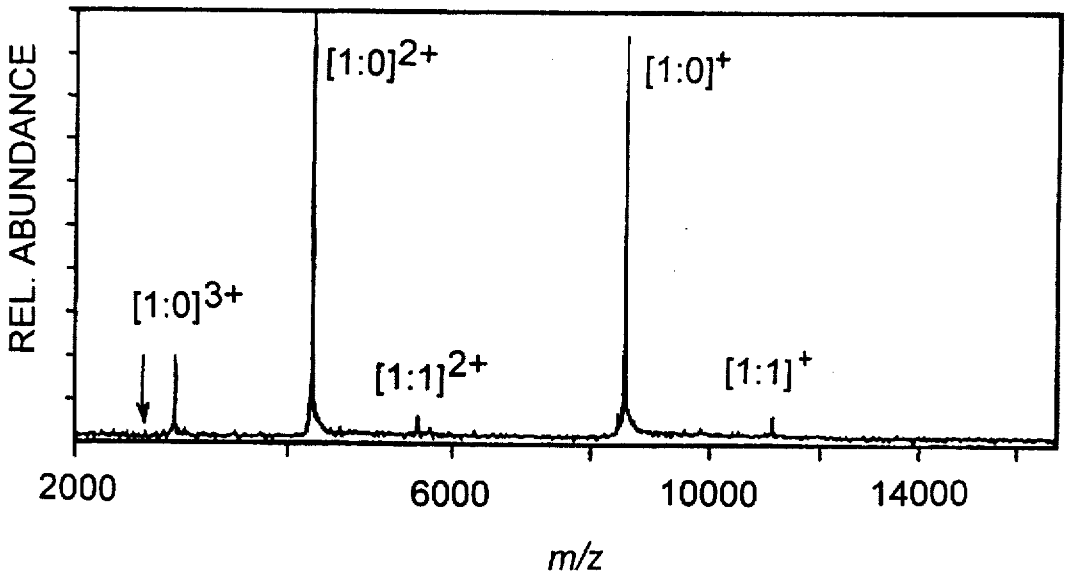

The effect of the matrix is also important in MALDI mass spectrometry. The MALDI mass spectrum of an equimolar mixture of bovine ubiquitin and $A_{OX}$ is shown in FIG. 2 for (A) sinapinic acid and (B) α-cyano-4-hydroxycinnamic acid as the matrices. The latter spectrum is dominated by signals for the singly, doubly and triply charged ubiquitin, but the signal for $A_{OX}$ is entirely absent (see arrow) and only a minor peak representing its complex with the protein is observed. However, with sinapinic acid as the matrix (FIG. 2A), the most prominent peak is due to the $[1:1]^+$ complex, in addition to major peaks representing the $(M+H)^+$ ion of ubiquitin itself $[1:0]^+$ and its protonated complex with two $A_{OX}$ molecules, $[1:2]^+$. There is a very small signal for $A_{OX}$ alone, broadened by alkali ion adducts.

EXAMPLE 2

Application to oligonucleotides as the polyacidic analytes. Small oligodeoxyribonucleotides (<10-mers) formed complexes with many of the polybasic peptides listed in Table I. As matrices, sinapinic acid, anthranilic acid and 3-aminopyrazine-2-carboxylic acid were most effective in the formation of complex ions.

Larger oligonucleotides did not form complexes with the smaller peptides, perhaps because the higher order structure of the nucleotides interferes with the stabilization of the complex and, therefore, larger polybasic reagents are recommended for such larger oligonucleotides. Because histones are some of the strongest DNA-binding proteins (17) and histone H4 has the highest arginine content among the inner histones (18), its suitability as a complexing agent was explored.

Figure 3:
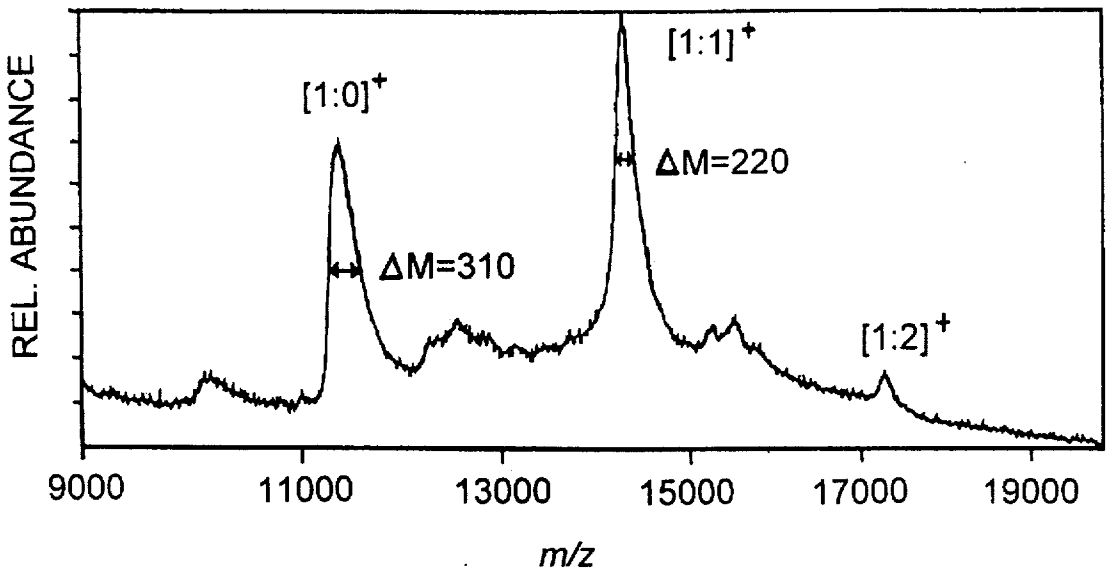
FIG. 3. UV-MALDI mass spectrum of the complex of histone H4 from calf thymus ($[1:0]^+$=m/z 11387 obtained by external calibration) with decathymidilic acid $d[T]_{10}$ ($M_r$= 2980.0). Matrix: sinapinic acid.

The UV-MALDI mass spectrum of an equimolar mixture of H4 and single-stranded $d[T]_{10}$ (FIG. 3) exhibits abundant $[1:1]^+$ and a low level of $[1:2]^+$ complex ions. The peak for the protonated histone, $[1:0]^+$, centers around M/Z 11387 and the $[1:1]^+$ complex is found at M/Z 14316. The difference of 2929 is somewhat lower than 2980.0, the molecular weight of $d[T]_{10}$. It is of interest to note that the peak of the complex ion is narrower (Δ=220 Da at FWHM) and more symmetrical than that of the H4 ion, which has a Δ of 310 Da. The broadness of the latter peak is partly due to the nonhomogeneity of the post-translational modifications of H4 (five acetylation and two methylation sites) (18) and may also be due to the attachment of inorganic anions, which could cause the trailing high-mass side of the peak. The narrower complex peak could be explained by the displacement of the anions by the nucleotide or by selective complexing of the less acetylated components of H4. The latter possibility is less likely, since the acetylation involves the N-terminus and the four lysines nearby and, as we have already mentioned, even unacetylated (i.e., still basic) lysine has little complexing effect. MALDI mass spectrum of a larger oligonucleotide, $dp[T]_{20}$, with histone H4 also showed the $[1:1]^+$ ion but the signal was considerably lower. These experiments demonstrate that the complexing phenomenon is applicable to oligonucleotides, but in order to obtain accurate molecular weight information a homogeneous arginine-rich polypeptide would be preferred to an inhomogeneous naturally occurring DNA-binding protein.

EXAMPLE 3

Application to heparin-derived oligosaccharides as the polyacidic analytes. The glycosaminoglycan (GAG) heparin is a linear, polydisperse, highly sulfated polysaccharide ranging in molecular weight from 5–40 kDa. It is a very heterogeneous polymer composed of disaccharide units, which consist of a uronic acid (D-glucuronic or L-iduronic acid) and a glucosamine, that are sulfated to various degrees on the —OH and —$NH_2$ groups; the latter are always either acetylated or sulfated. In addition to its long-standing and wide use as an anticoagulant, heparin has many other biological functions but its detailed structure is undefined (19). These polymers can be degraded enzymatically and/or with nitrous acid into smaller subunits more amenable to structure determination. Because of their heterogeneity, obtaining the molecular weights of these components is an important first step.

Mass spectrometric investigation of heparin-derived oligosaccharides poses a serious challenge because they have to be extensively purified and desalted for negative ion fast atom bombardment mass spectrometry. This methodology requires large amounts of material (10 nmol/μl) and still results in partially sodiated anions of monosulfated disaccharides and polysulfated di- to octasaccharides, which contain up to 15 $Na^+$ ions (20–22). Probably because of these difficulties, little mass spectrometric work concerning this biologically important class of compounds has been reported to date.

Similar difficulties are also encountered with MALDI, in spite of its intrinsically higher sensitivity. For di- and trisulfated heparin-derived disaccharides as much as 100 pmol/μl was required to obtain a negative ion signal, and even then the signal-to-noise ratio was poor. However, upon addition of a basic peptide, sub-picomole sensitivity in the positive ion mode was attained. When 3 pmol/μl of the octasulfated hexasaccharide H1 of Table II (23), was mixed with a basic peptide such as SP-3 (Table I), the spectrum shown in FIG. 4 resulted.

Figure 4:
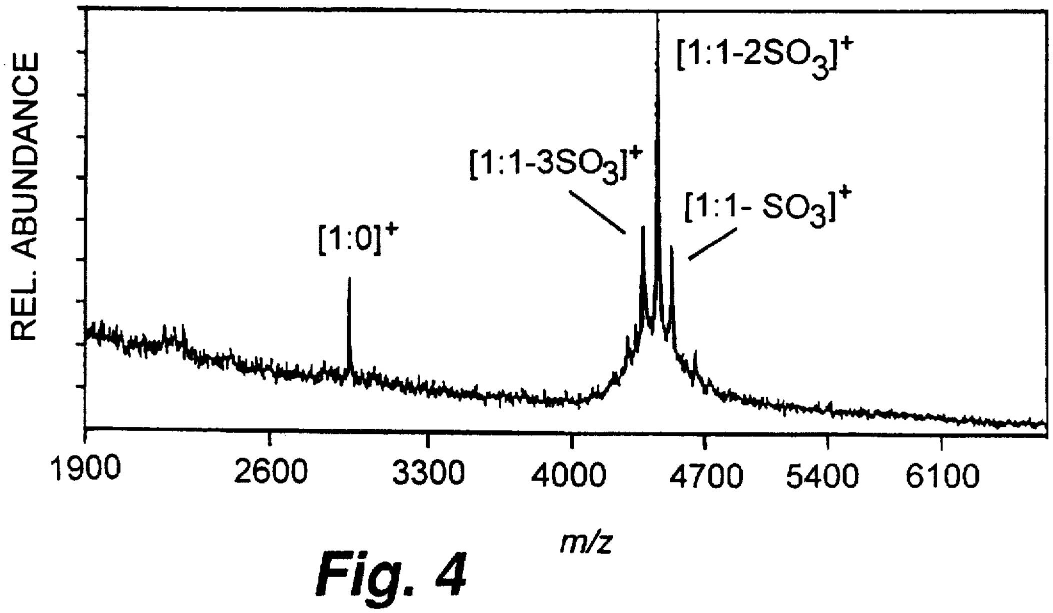
FIG. 4. MALDI mass spectrum of an equimolar mixture (3 pmol each) of the heparin derived hexasaccharide H1 with the synthetic peptide SP-3. Wavelength: 337 nm. Matrix: sinapinic acid. The small peak at m/z 4650 corresponds to the photoadduct of the matrix on the most abundant ion.

FIG. 4 exhibits good signals related to the $[1:1]^+$ ion, but some fragmentation has taken place. The most abundant ion is the $[1:1\text{-}2SO_3]^+$ (m/z measured: 4441.1; m/z calculated: 4438.8), accompanied by the complexes that have lost one, $SO_3$ group (m/z measured: 4519.2; m/z calculated: 4518.8) and three $SO_3$ groups (m/z measured: 4363.5; m/z calculated: 4358.8), respectively. The $[1:0]^+$ ion was found to have m/z 2943.7 (calculated: 2943.4) by external calibration. Because of the structural constraints of the nitrous acid degradation products of heparin, at this level of mass accuracy (0.05% for the averaged values of the three signals) the information provided by the mass spectrum allows one to conclude unambiguously that the material is a hexasaccharide with a total of seven or more sulfation sites where all the glucosamine residues are N-sulfated. For the known octasulfated hexasaccharide H1, the m/z value of the $[1:1\text{-}SO_3]^+$ ion would give $M_r$=1655.8 whereas the calculated value is 1655.4. It should be noted that no cation adducts were observed for any of the peptide-heparin complexes we have measured, even though the sulfated oligosaccharides were used as sodium or ammonium salts.

EXAMPLE 4

Application to aromatic polysulfonic acids as the polyacidic analytes. Suramin has been used for many decades as an effective drug against Trypanosoma viruses, which cause sleeping sickness and river blindness, and is also a potent inhibitor of the reverse transcriptase activity of retroviruses (24). The high polarity of the two trisulfonic acid moieties of this compound makes it difficult to ionize suramin.

Figure 5:
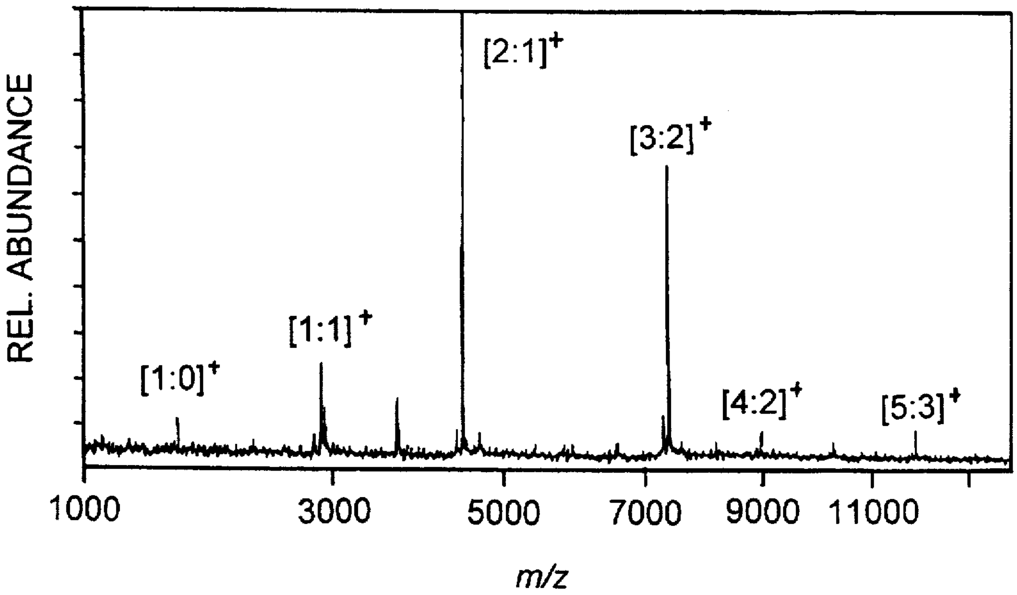
FIG. 5. UV-MALDI mass spectrum of a mixture of suramin ($M_r$=1297.2, free acid) with a twofold molar excess of TPKS.

For mass spectra produced by fast atom bombardment ionization, a signal-to-background ratio of 100 has been reported without specifying the amount of material required (probably nanomoles) (25). The MALDI spectrum (not shown) of the free acid (generated by mixing the sodium salt with a few cation exchange beads) can be obtained in the negative ion mode with 2,5-dihydroxybenzoic acid as matrix, but it still exhibits $Na^+$ adducts. However, upon addition of a polybasic peptide, abundant complex ions (free of cation adducts) are produced in the positive ion mode. A typical spectrum obtained with approximately 5 pmol/μl suramin and a two-fold molar excess of TPKS with sinapinic acid as the matrix is shown in FIG. 5. Under these conditions, the $[2:1]^+$ complex gives rise to the most abundant ion, possibly because one peptide molecule each complexes with one of the naphthyl-trisulfonic acid moieties. The higher order complexes may be linear aggregates, and the $[1:1]^+$ and $[2:1]^+$ complex ions are still detectable at a level of 0.075 pmol/μl of suramin, indicating the remarkable sensitivity of MALDI for highly sulfonated compounds when complexed in this manner.

Strong complex ions were also obtained with mixtures of basic peptides and suramin analogues containing only two sulfonic acid groups on the naphthalene moieties and linked by only two or three aminobenzoic acid units. Thus, the effect of the complexing with basic components is a general property of this group of naphthyl-sulfonic acid derivatives.

EXAMPLE 5

Application to disaccharides as the polyacidic analytes. Heparin-derived oligosaccharides and polybasic peptides/proteins were usually mixed in the presence of the matrix in equimolar proportions. For unknown reasons, when the components were mixed in advance as aqueous solutions and the matrix was added later, a considerably lower degree of complex formation was observed. The sample solution contained the components at 0.5–10 pmol/μl level (although an order of magnitude less could still be used). Of the final solution, 0.5–1.0 μl was put on the probe surface and dried with the assistance of a stream of air.

Although a hexa-arginine with a hydrophobic C-terminal tail (in Table I) worked well with heparin fragments up to hexasaccharides, peptides that combine a high arginine content and backbone flexibility with the lowest possible molecular weight significantly increase the efficiency of complex formation with larger heparin fragments. A low molecular weight of the polybasic reagent is desirable in order to keep the weight of the complex itself low and to thus increase the accuracy of the mass determination. For this purpose, two peptides in which arginine and glycine alternate (SP-4 and SP-5) were synthetized at the Biopolymer Laboratory ar MIT. Mass spectra with a caffeic acid matrix were found to be sensitive to the presence of inorganic anions with very basic peptides/proteins (especially with SP-4 and SP-5 in Table I). It was, therefore, useful to exchange the anions with a resin (AG 1-X2, Bio-Rad Laboratories, Richmond, Calif.). As free bases, these peptides are quite unstable in aqueous solution and must, therefore, be prepared daily.

Heparin-derived oligosaccharides of known structure used in this study are compiled in Table II. Disaccharides D1 and D2 are end-products of enzymatic depolymerization of the GAG heparin. These compounds were purchased from Sigma (St. Louis, Mo.) and used as sodium salts. A great advantage of the complex formation method of the present invention is that salts can be analyzed as efficiently as their free acids without the interference of cation adducts.

Applying the complex formation technique of the present invention to heparin oligosaccharides, almost exclusively [1:1] complexes form with the peptides in Table I. The detected ions are the protonated (in the positive ion mode) or deprotonated (in the negative ion mode) complexes. The positive ion mode was utilized in the complex formation experiments described below. The molecular weight of a given heparin component was derived by subtracting the molecular weight of the polybasic reagent from that of the [1:1] complex determined from the time-of-flight mass spectrum. In most cases calibration was carried out by means of an external standard, and a mass accuracy of 0.1% was easily attained. If the polybasic peptide exhibited more than one peak in the mass spectrum (e.g., the singly and doubly protonated peptide molecules), these peaks could be used as internal references, reducing the error of mass measurements by a factor of 2–3.

Figure 6A:
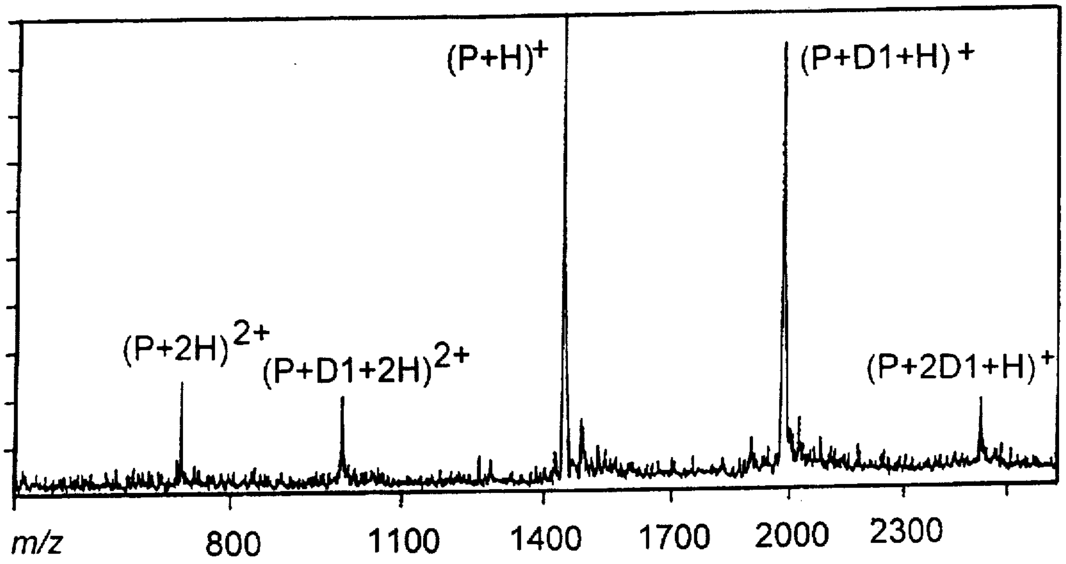
FIG. 6. IR-MALDI mass spectra of heparin disaccharides D1 and D2 mixed with the synthetic peptide SP-2 ($M_r$= 1441.7). In the figure, "P" represents SP-2. Matrix: 5-(trifluoromethyl)uracil. a. Disaccharide D1 ($M_r$=539.4), 7 laser shots averaged. b. Disaccharide D2 ($M_r$=577.4), 19 laser shots averaged. The lability of N-sulfate group(s) is obvious from spectrum b.
Figure 6B:
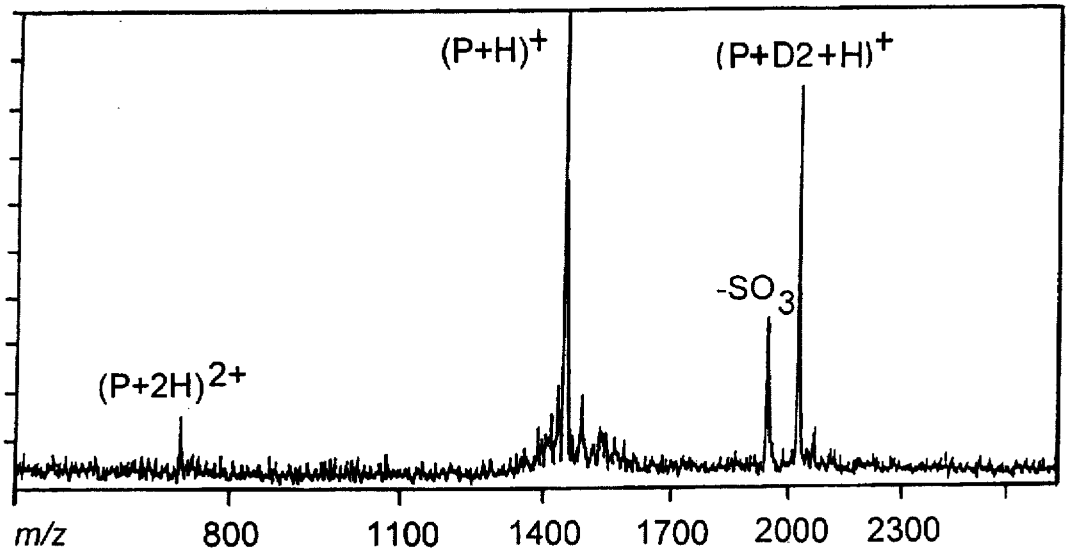

Glycosaminoglycan heparin is built up from disaccharide units: a hexuronic acid (D-glucuronic acid or L-iduronic acid) 1–4 linked to a D-glucosamine residue (19). There are four possible sulfation sites in this "repeating unit": position 2 on the hexuronic acid, positions 3, 6, and the 2-amino group on the glucosamine residue. Since position 3 is very rarely sulfated, and even then the hexuronic acid on the non-reducing side is not sulfated (27), heparin disaccharides contain up to three sulfate groups. The relative difficulty of detecting disaccharides as ionic complexes is related to the small number of sulfate groups which is not sufficient to provide strong binding to the polybasic peptides. IR-MALDI mass spectra of the disaccharides D1 and D2 with synthetic peptide SP-4 are shown in FIG. 6. From the spectrum it is obvious that the loss of a $SO_3$ group must affect the N-linked sulfate group since no loss of $SO_3$ is found if only O-linked sulfate groups are present. This finding is corroborated by data (not shown) for other disulfated disaccharides containing N-sulfate groups. Although IR-MALDI is claimed to be less sensitive than UV-MALDI (38), still as little as 150 fmol of the disaccharide D2 could be successfully analyzed by the complexing method of the present invention.

EXAMPLE 6

Application to higher oligosaccharides as the polyacidic analytes. With an increasing number of saccharide units and sulfation sites, binding to the polybasic peptides of the present invention becomes stronger and the relative abundance of the complex ion(s) increase(s). On the other hand, the tendency to lose sulfate groups more strongly affects the O-linked $SO_3$ groups as well. For example, in IR-MALDI with TFMU matrix, intact molecular ions of higher oligosaccharides (T1, P1, or H1 in Table II) could no longer be observed. The problem of $SO_3$ loss is particularly acute if one wishes to analyze a mixture of nonhomogeneously sulfated components. In order to minimize desulfation in the ion formation process, a wide variety of matrix/basic peptide combinations were tested. In this respect, the specifically designed peptides SP-4 and SP-5 were most effective. Preferably, the number of arginine residues should exceed the number of sulfate groups. Two known UV matrices, caffeic acid (39 ) and 3- hydroxypicolinic acid (8), turned out to be the most efficient matrices.

Figure 7:
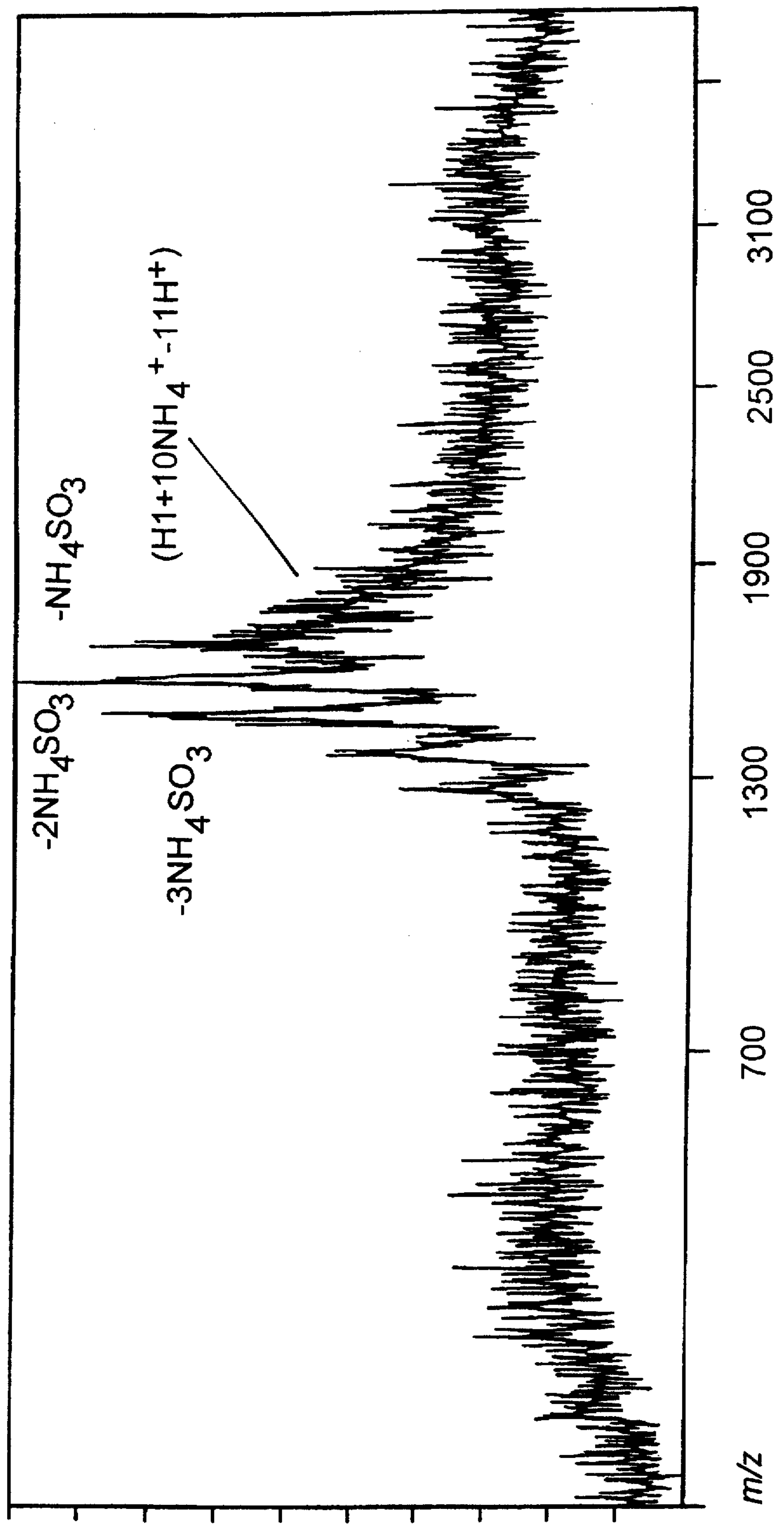
FIG. 7. IR-MALDI mass spectrum of the ammonium salt of the hexasaccharide H1 ($M_r$=1842.7 - ammonium salt). Matrix: hydantoin, the spectrum is an average of 10 laser shots. This is the only wavelength/matrix combination by which signal (although with very poor signal-to-noise ratio) of the intact molecule could be obtained. The total sample load was 100 pmol.
Figure 8A:
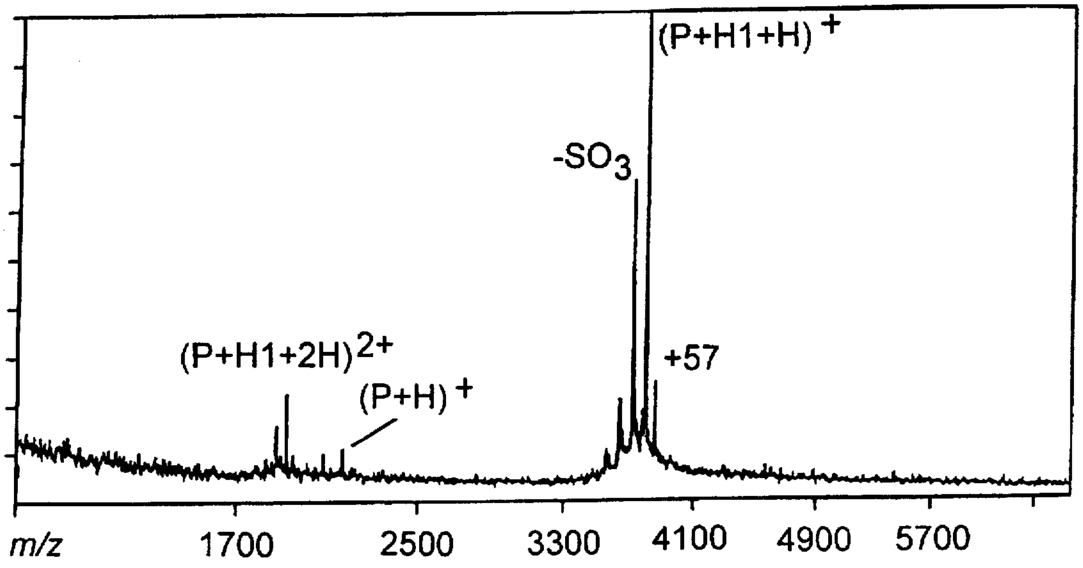
FIG. 8. UV-MALDI mass spectra of equimolar mixtures of the hexasaccharide H1 ($M_r$=1655.4-free acid) and the synthetic peptide SP-4 ($M_r$=2150.4). In the figure, "P" represents SP-4. a. Matrix: caffeic acid, total sample load: 3 pmol. b. Matrix: 3-hydroxypicolinic acid, total sample load: 1 pmol. Unassigned peaks of lower abundance correspond to by-products of SP-4.
Figure 8B:
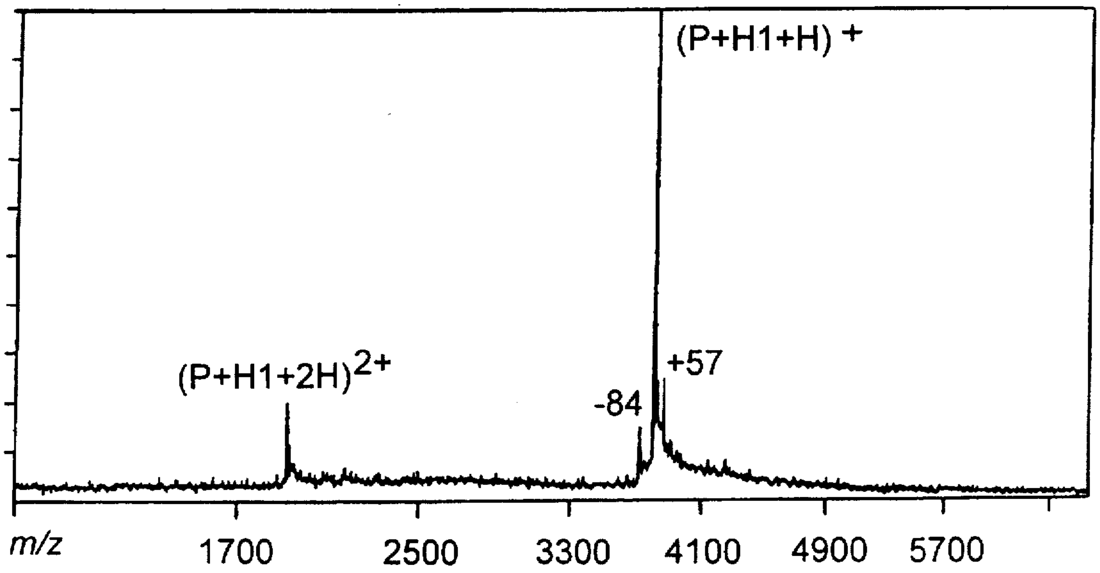

The efficiency of the complex formation method is illustrated in FIGS. 7 and 8. In FIG. 7 the best spectrum of the hexasaccharide without a polybasic peptide as a complexing reagent is presented. One hundred pmol of the ammonium salt was loaded on the probe tip. Even at this sample level the signal-to-noise ratio is very poor and extensive loss of $NH_4SO_3$ is observed. FIGS. 8*a* and 8*b* present the UV-MALDI mass spectra of equimolar mixtures of this hexasaccharide and the basic peptide SP-4 with caffeic acid (8*a*) and 3-hydroxypicolinic acid (8*b*) as matrices. In both examples the total sample load is approximately 1 pmol.

Although sulfate loss is still observed in FIG. 8*b*, the most abundant ion is the intact complex. The presence of the singly and doubly protonated complex and the presence of the peptide ion allowed determination of the molecular weight of the hexasaccharide using only one reference mass ($M_{SP-4}$=2150.41 Da). This calibration procedure yielded 1655.17 Da in good agreement with the theoretical value: 1655.37 Da. Sulfate loss is completely eliminated by the use of 3-hydroxypicolinic acid matrix. Note that the peak pattern in FIG. 8*b* is due to by-products of the synthesis of SP-4: one peak is 57 Da higher corresponding to the $(RG)_{10}G$ composition, another peak of unknown identity is 84 Da lower. This example is unique in that 3-hydroxypicolinic acid matrix yields very poor MALDI spectrum of SP-4 alone and no spectrum at all of H1 alone. Nonetheless, the complex of the components desorbs easily. Thus, if SP-4 is regarded as a polybasic analyte, H1 in this example may be regarded as a polyacidic reagent (although acting in the positive ion mode).

Figure 9:
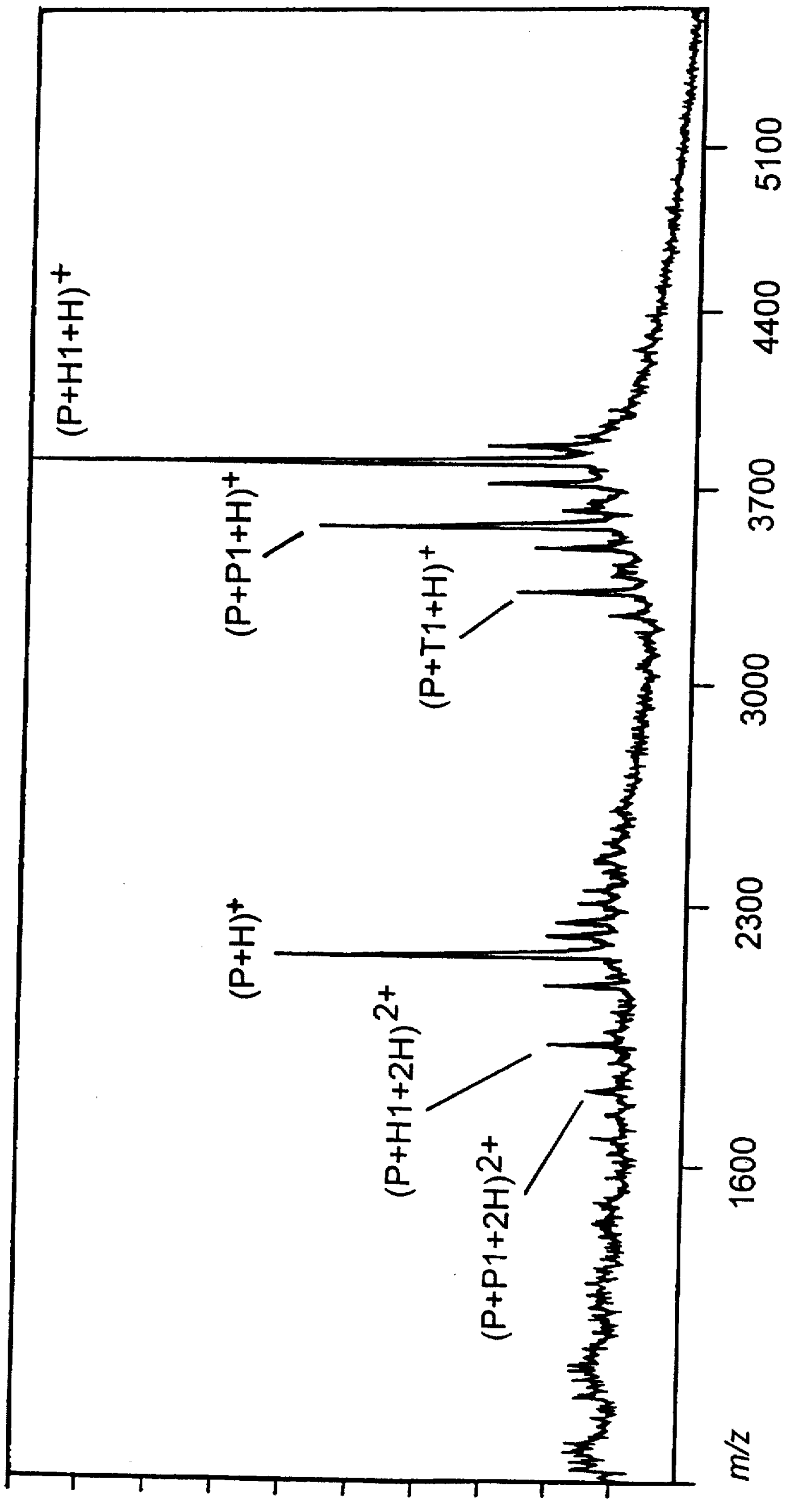
FIG. 9. UV-MALDI mass spectrum of a mixture containing three heparin-derived oligosaccharides: tetrasaccharide T1 ($M_r$=1172.9), pentasaccharide P1 ($M_r$=1414.2), and hexasaccharide H1 ($M_r$=1655.4). The basic peptide was SP-4. In the figure, "P" represents SP-4. Total sample load was around 500 fmol for each oligosaccharide component and 1.5 pmol for the peptide. Matrix: 3-hydroxypicolinic acid.
Figure 10A:
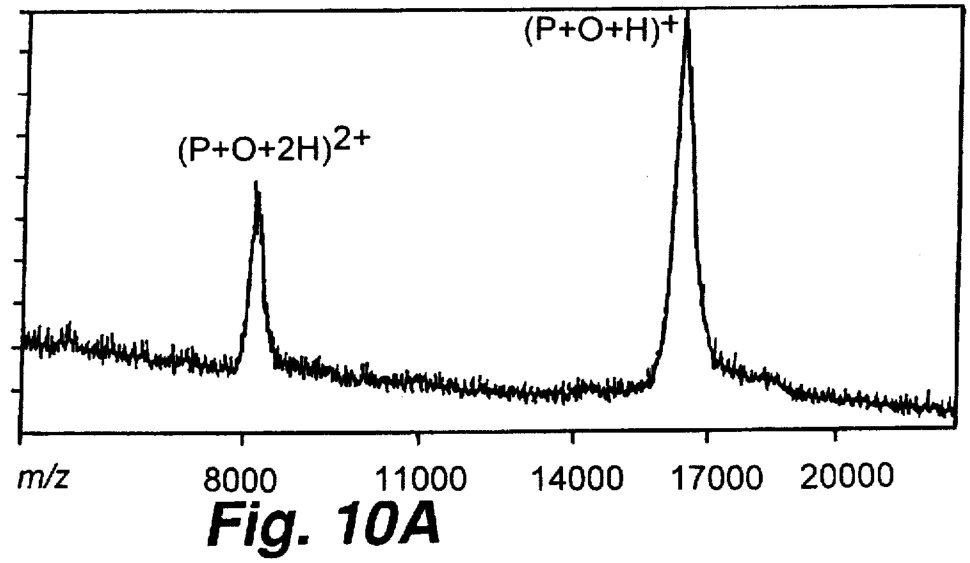
FIG. 10. Heparin binding of the protein angiogenin studied with sinapinic acid matrix at 337 nm irradiation. a. Neat angiogenin ($M_r$=14121). b. "Equimolar" mixture of angiogenin and the octasaccharide fraction. For the average molecular weight of the heparin fraction $M_{avg}$=2149 Da was found. c. "Equimolar" mixture of angiogenin and the dodecasaccharide fraction, $M_{avg}$=3199 Da. In the figure, "P" represents angiogenin, "0" represents the octasaccharide and "DD" represents the dodecasaccharide.
Figure 10B:
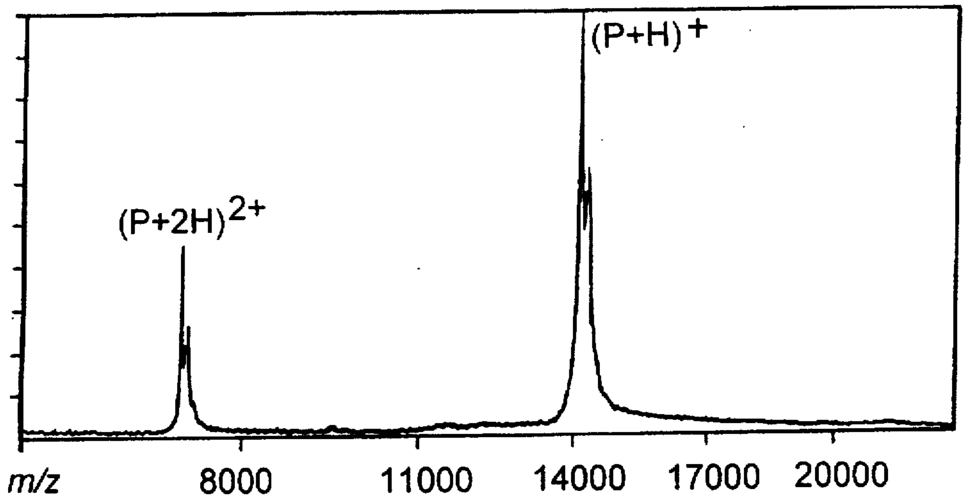
Figure 10C:
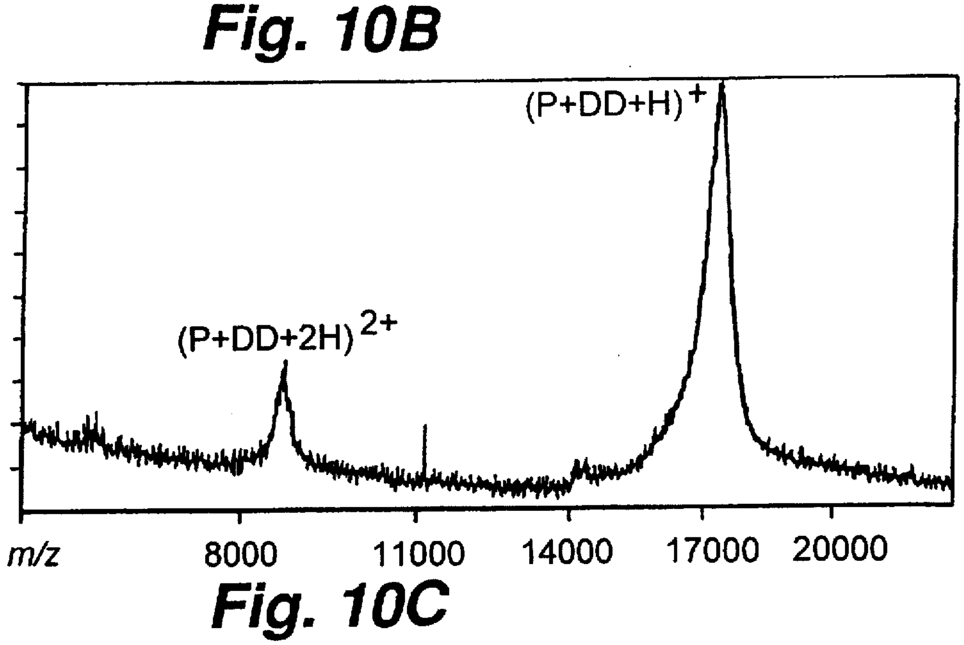

Isolation and purification of a single heparin oligosaccharide component is extremely tedious (34) and, therefore, the ability to analyze oligosaccharide mixtures is very useful. Three components, tetrasaccharide T1, pentasaccharide P1, and hexasaccharide H1 were mixed and analyzed after adding the peptide SP-4. The mixture contained 4 pmol/μl peptide and approximately 1 pmol/μl of each oligosaccharide component (for T1 and P1 there is an uncertainty of a factor of two). Of this solution, 0.5 μl was loaded on the probe (corresponding to 0.5 pmol/oligosaccharide component). The MALDI mass spectrum with 3-hydroxypicolinic acid matrix is shown in FIG. 9. All three components can easily be detected in the presence of each other. Using external calibration, the molecular masses of the three components are (after subtracting the molecular weight of the polybasic peptide from the masses determined for the complexes): 1172.9 Da, 1414.0 Da, and 1655.7 Da, respectively. This mass accuracy is within 0.02% (compare with Table II) and, knowing the origin of the oligosaccharides (i.e., products of enzymatic depolymerization or nitrous acid degradation), permits the unambiguous determination of the number of saccharide units and the degree of sulfation and N-acetylation.

EXAMPLE 7

Application to heparin fractions as the polyacidic analytes with angiogenin as the polybasic reagent. Angiogenin isolated from human tumor cells (40), a protein of 14.1 kDa molecular weight, is an angiogenic factor which is capable of inducing blood vessel formation in chick embryo chorioallantoic membrane and the rabbit cornea. Its sequence has been determined by Edman degradation (41) and DNA sequencing (42). In accordance with the results from the Edman experiments and its MALDI mass spectrum, the N-terminus is blocked by pyroglutamic acid. The molecular weight of the protein is, therefore, 14,121 Da.

Figure 11:
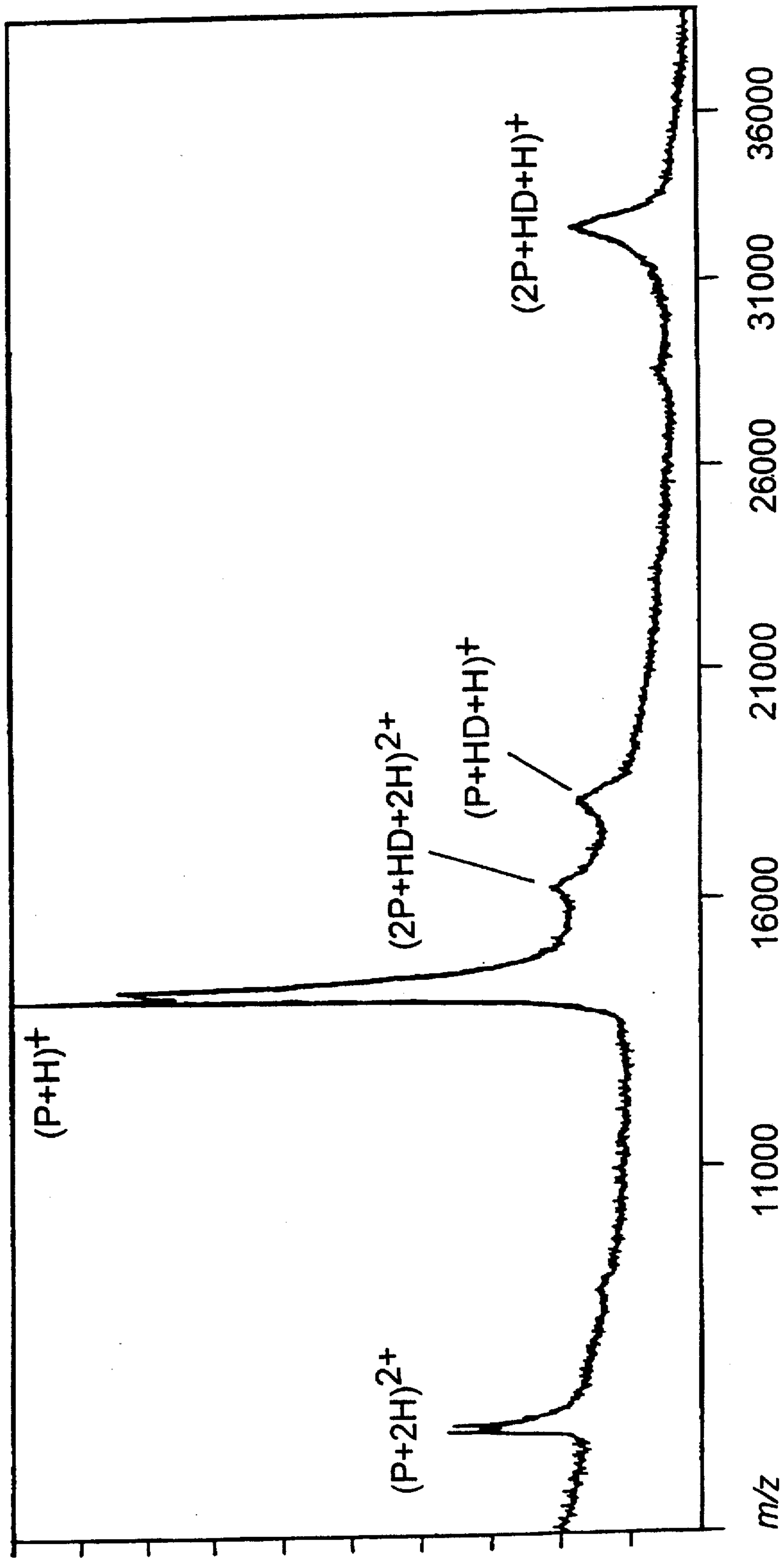
FIG. 11. UV-MALDI mass spectrum of a mixture of angiogenin and the hexadecasaccharide heparin fraction. Matrix: sinapinic acid. The preferred complex composition is 2:1 protein-oligosaccharide. The average molecular weight of the 2:1 complex distribution is 32501 and, after subtracting the contribution of the protein, $M_{avg}$=4260 is found for the oligosaccharide distribution. In the figure, "P" represents angiogenin, "HD" represents the hexadecasaccharide.
Figure 12:
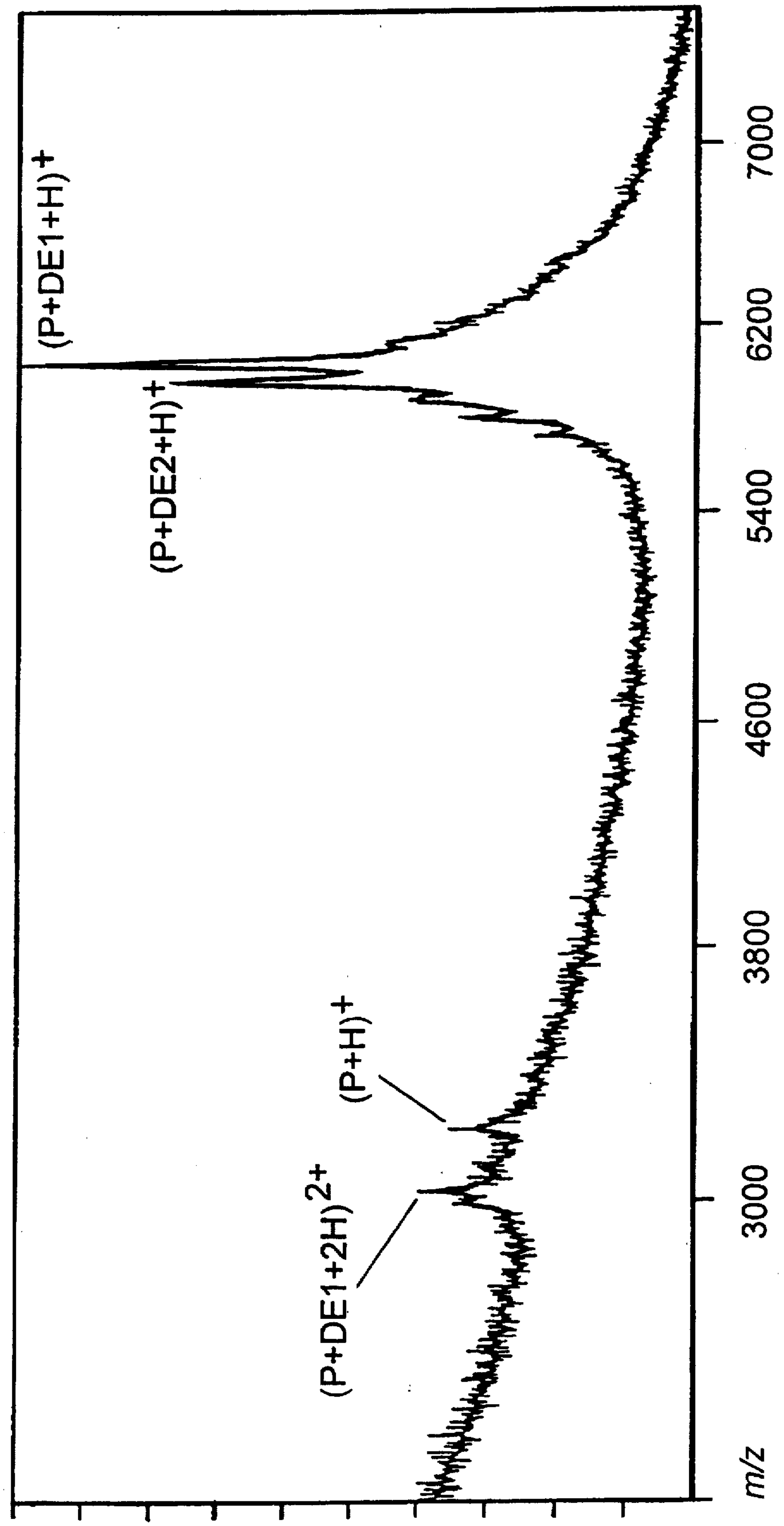
FIG. 12. UV-MALDI mass spectrum of the decasaccharide heparin fraction mixed with the synthetic peptide SP-5 ($M_r$=3216.6). Matrix: 3-hydroxypicolinic acid. In this m/z range individual heparin components can be resolved. The two most abundant heparin components correspond to decasaccharides with fourteen and thirteen sulfate groups ($M_r$=2810.3 and 2730.3, respectively), with all the glucosamine groups N-sulfated. In the figure, "P" represents SP-5, "DEI" represents the decasaccharide with fourteen sulfate groups and "DE2" represents the decasaccharide with thirteen sulfates.

The heparin binding properties of human tumor angiogenin has been studied by F. Soncin and B. L. Vallee (personal communication). The GAG heparin was degraded by nitrous acid, and the resulting mixture was fractionated by gel filtration. The fractions were assumed to differ by one disaccharide unit each. Five heparin fractions obtained from the gel filtration procedure were used as polyacidic analytes and angiogenin itself was used as the polybasic reagent in complex formation experiments. Sinapinic acid matrix yielded the best MALDI mass spectra (3-hydroxypicolinic acid is a poor matrix for proteins), some of which are shown in FIGS. 10*a–c* and FIG. 11. Complex ions are abundant in these spectra but, due to the nonhomogeneity of the fractions and to the high mass of the ions, the individual heparin components cannot be resolved. The average molecular weights determined by external calibration and subtraction of the molecular mass of the protonated polypeptide, were 2149, 2741, 3199, 3722, and 4260 Da, respectively, for these heparin fractions. In the last case a 2:1 protein-heparin complex was observed rather than 1:1 (FIG. 11). This series appears to correspond to 8, 10, 12, 14, and 16 saccharide units. Expected molecular weights assuming trisulfated disaccharide repeating units are 2232.8, 2810.3, 3387.8, 3965.2, and 4542.7 Da, respectively. This discrepancy between experimental and theoretical values arises partly from a lower degree of sulfation within any given fraction, and possibly from loss of $SO_3$ groups upon ionization. In order to estimate the extent of sulfate loss in the ionization process, the fractions were ionized with the aid of SP-5 as the polybasic component and 3-hydroxypicolinic acid as the matrix. The mass spectrum obtained for the decasaccharide fraction is shown in FIG. 12. Under these conditions the components of the heparin fraction can be resolved reasonably well. External calibration yielded 2823.7, 2745.1, 2673.3, and 2582.8 Da, respectively.

TABLE I

Basic components used in the complex formation experiments.

| Basic component | Sequence* | $M_r$ |
|---|---|---|
| 1. Neurotensin [8–13] | RRPYIL | 818.01 |
| 2. Dynorphin [1–9] | YGGFLRRIR | 1137.36 |
| 3. Synthetic peptide "SP-1" | RKKRRQRRR | 1339.62 |
| 4. Synthetic peptide "SP-2" | RRRRRRPYIL | 1441.76 |
| 5. TPKS | RRLIEDNEYTARG | 1592.74 |
| 6. Renin Substrate [1–13] | DRVYIHPFHLVIH | 1645.92 |
| 7. Synthetic peptide "SP-4" | $(RG)_{10}$ | 2150.41 |
| 8. Melittin | GIGAVLKVLTTGL-PALISWIKRKRQQ | 2847.49 |
| 9. Synthetic peptide "SP-3" | IRRERNKMAAAK-SRNRRRELTDTL | 2942.41 |
| 10. Synthetic peptide "SP-5" | $(RG)_{15}$ | 3216.61 |
| 11. β-Endorphin | YGGFMTSEKSQTP-LVTLFKNAIIKNA-YKKGE | 3465.04 |
| 12. Growth Hormone Releasing Factor (bovine) | YADAIFTNSYRKV-LGQLSARKLLQDI-MNRQQGERNQEQG-AKVRL | 5108.83 |
| 13. Insulin (bovine) | Arg: 1, Lys: 1, His: 2 | 5733.56 |
| 14. Ubiquitin (bovine) | Arg: 4, Lys: 11, His: 2 | 8564.85 |
| 15. Histone H4 (calf thymus) | Arg: 14, Lys: 11, His: 2 | 11236.2** |
| 16. Cytochrome C (horse) | Arg: 2, Lys: 18, His: 3 | 12360.1 |
| 17. Angiogenin (human) | Arg: 13, Lys: 7, His: 5 | 14121.0 |

*Full amino acid sequence for polypeptides 1–10 using single letter amino acid residue abbreviations; number of Arg, Lys and His residues for polypeptides 11–14.

**$M_r$ based on the amino acid sequence without post-translational modifications.

TABLE II

Oligosaccharides used in the complex formation experiments.

| Symbol/ Mol. w. | Structure |
|---|---|
| D1 539.4 | 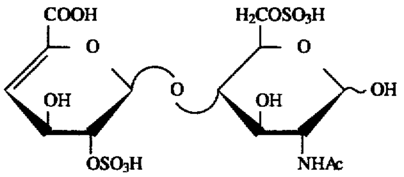 |
| D2 577.4 | 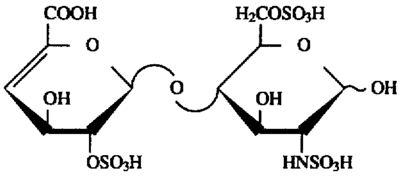 |
| T1 1273.0 | 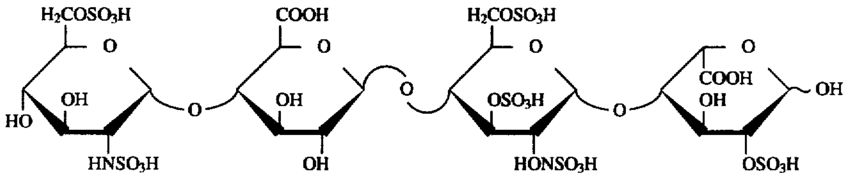 |
| P1 1414.2 | 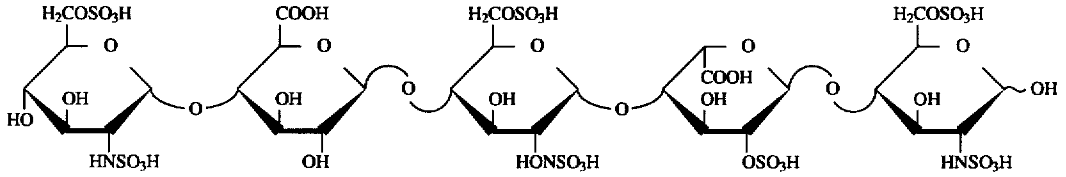 |
| H1 1655.4 | 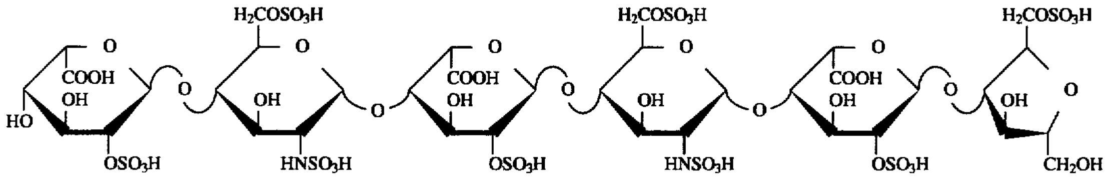 |

REFERENCES

1. Karas, M., Bachmann, D., Bahr, U. & Hillenkamp, F. (1987) *Int. J. Mass Spectrom. Ion Processes* 78, 53–68.

2. Tanaka, K., Waki, H., Ido, Y. & Akita, S. (1989) *Rapid Commun. Mass Spectrom.* 3, 151–153.

3. Karas, M., Bahr, U., Ingendoh, A. & Hillenkamp, F. (1989) *Angew. Chem. Int. Ed. Engl.* 78, 760–761.

4. Beavis, R. C. & Chait, B. T. (1990) *Anal. Chem.* 62, 1836–1840.

5. Jiménez, C. R., van Veelen, P. A., Li, K. W., Wildering, W. C., Geraerts, W. P. M., Tjaden, U. R. & van der Greef, J. (1994) *J. Neurochem.* 62, 404–407.

6. Stahl, B., Steup, M., Karas, M. & Hillenkamp, F. (1990) *Anal. Chem.* 63, 1463–1466.

7. Nordhoff, E., Ingendoh, A., Cramer, R., Overberg, A., Stahl, B., Karas, M., Hillenkamp, F. & Crain, P. F. (1992) *Rapid Commun. Mass Spectrom.* 6, 771–776.

8. Wu, K. J., Steding, A. & Becker, C. H. (1993) *Rapid Commun. Mass Spectrom.* 7, 142–146.

9. Juhasz, P. & Costello, C. E. (1992) *J. Am. Soc. Mass Spectrom.* 3, 785–796.

10. Bahr, U., Deppe, A., Karas, M. & Hillenkamp, F. (1992) *Anal. Chem.* 64, 2866–2869.

11. Juhasz, P. & Costello, C. E. (1993) *Rapid Commun. Mass Spectrom.* 7, 343–351.

12. Chait, B. T., Wang, R., Beavis, R. C. & Kent, S. B. H. (1993) *Science* 262, 89–92.

13. Juhasz, P., Costello, C. E. & Biemann, K. (1993) *J. Am. Soc. Mass Spectrom.* 4,399–409.

14. Oakey, N. S. & Macfarlane, R. D. (1967) *Nucl. Instrum. Methods* 49, 220–228.

15. Brown, R. S. & Gilfrich, N. L. (1992) *Rapid Commun. Mass Spectrom.* 6, 697–701.

16. Overberg, A., Karas, M., Bahr, U., Kaufmann, R. & Hillenkamp, F. (1990) *Rapid Commun. Mass Spectrom.* 4, 293–296.

17. Isenberg, I. (1979) *Ann. Rev. Biochem.* 48, 159–191.

18. Turner, B. M., O'Neill, L. P. & Allan, I. M. (1989) *FEBS Lett.* 253, 141–145.

19. Linhardt, R. (1991) *Chemistry & Industry*, 2, 45–50.

20. Reinhold, V. N., Carr, S. A., Green, B. N., Petitou, M., Choay, J. & Sinay, P. (1987) *Carbohydr. Res.* 161,305–313.

21. Mallis, L. M., Wang, H. M., Loganathan, D. & Linhardt, R. J. (1989) *Anal. Chem.* 61, 1453–1458.

22. Linhardt, R. J., Wang, H. M., Loganathan, D., Lamb, D. J. & Mallis, L. M. (1992) *Carbohydr. Res.*, 225 137–145.

23. Tyrrell, D. J., Ishihara, M., Rao, N., Horne, A., Kiefer, M. C., Stauber, G. B., Lam, L. H. & Stack, R. J. (1992) *J. Biol. Chem.* 268, 4684–4689.

24. DeClercq, E. (1979) *Cancer Lett.* 8, 9–22.

25. Holzmann, G., Ostwald, U., Nickel, P., Haack, H. -J., Widjaja, H. & Arduny, U. (1985) *Biomed. Mass Spectrom.* 12, 659–663.

26. J. T. Gallagher, J. E. Turnbull, and M. Lyon, in D. A. Lane, I. Björk, and U. Lindahl (Eds.) Heparin and Related Polysaccharides, Plenum Press, New York, (1992) p. 49–59.

27. U. Lindahl, G. Bäckström, M. Höök, L. Thunberg, and I. G. Leder, *Proc. Natl. Acad. Sci. U.S.A.*, 77 (1980) 6551–6555.

28. B. Casu, P. Oreste, G. Torri, G. Zopetti, J. Choay, J. -L. Lormeau, M. Petitou, and P. Sinay, *Biochem. J.*, 197 (1981) 599–609.

29. L. Thunberg, G. Bäckström, and U. Lindahl, *Carbohydr. Res.*, 100 (1982) 393–410.

30. U. Lindahl, G. Bäckström, and L. Thunberg, *J. Biol. Chem.*, 258 (1983) 9826–9830.

31. D. H. Atha, A. W. Stephens, and R. D. Rosenberg, *Proc. Natl. Acad. Sci. U.S.A.*, 81 (1984) 1030–1034.

32. W. H. Burgess and T. Maciag, *Annu. Rev. Biochem.*, 58 (1989 ) 575–606.

33. J. E. Turnbull, D. G. Fernig, Y. Ke, M. C. Wilkinson, and T. J. Gallagher, *J. Biol. Chem.*, 267 (1992) 10337–10341.

34. M. Ishihara, D. J. Tyrrell, D. G. Stauber, S. Brown, L. Lousens, and R. J. Stack, *J. Biol. Chem.*, 268 (1993 ) 4675–4683.

35. C. J. McNeal, R. D. MacFarlane, and I. Jardine, *Biochem. Biophys. Res. Commun.*, 139 (1986) 18–24.

36. S. A. Carr and V. N. Reinhold, *J. Carbohydr.* Chem., 3 (1984) 381–401.

37. W. Chai, B. N. Green, and A. M. Lawson, *Proceedings of the 41st ASMS Conference on Mass Spectrometry and Allied Topics*, May 31–Jun. 4, 1993, San Francisco, Calif., p. 85.

38. A. Overberg, M. Karas, U. Bahr, R. Kaufmann, and F. Hillenkamp, *Rapid Commun. Mass Spectrom.*, 4 (1990) 293–296.

39. R. C. Beavis and B. T. Chait, *Rapid Commun. Mass Spectrom.*, 3 (1989) 432–435.

40. J. W. Fett, D. J. Strydom, R. R. Lobb, E. M. Alderman, J. L. Bethune, J. F. Riordan, and B. L. Vallee, *Biochemistry*, 24 (1985) 5480–5486.

41. D. J. Strydom, J. W. Fett, R. R. Lobb, E. M. Alderman, J. L. Bethune, J. F. Riordan, and B. L. Vallee, *Biochemistry*, 24 (1985) 5486–5494.

42. K. Kurachi, E. W. Davie, D. J. Strydom, J. F. Riordan, and B. L. Vallee, *Biochemistry*, 24 (1985) 5494–5499.

We claim:

1. In a method of providing a measurement of a molecular weight, $M_A$, of a highly polyionic analyte moiety having a net ionic charge, subjecting the analyte to soft ionization mass spectrometry and calculating the molecular weight, the improvement comprising:

choosing at least one highly polyionic reagent moiety having a known molecular weight, $M_B$, and a net ionic charge opposite to said net ionic charge of said analyte;

mixing a solution including said analyte and said reagent;

allowing said solution to form at least one variety of a non-covalent complex of a number, m, of said reagent moieties and a number, n, of said analyte moieties, said complex having a molecular weight, m, of $mM_B$ plus $nM_A$ plus zH, a net ionic charge of z when subjected to ionization in a mass spectrometer, and a mass-to-charge ratio of m/z;

analyzing said sample by soft ionization mass spectrometry to generate a plot over a range of values of relative abundance versus a range of values of mass-to-charge ratio, said plot including a peak at a mass-to-charge ratio, X, corresponding to said mass-to-charge ratio of said complex; and calculating $M_A$ from said mass-to-charge ratio, X.

2. A method as in claim 1 wherein said polyionic reagent comprises a multiplicity of highly ionic functional groups covalently joined to a flexible molecular backbone.

3. A method as in claim 2 wherein said reagent is a polypeptide.

4. A method as in claim 2 wherein said reagent is a derivatized polypeptide.

5. A method as in claim 2 wherein said reagent includes at least one non-peptide segment in said backbone.

6. A method of providing a measurement of a molecular weight, $M_A$, of a highly polyionic analyte moiety having a net ionic charge, comprising:

choosing at least one highly polyionic reagent moiety having a known molecular weight, $M_B$, and a net ionic charge opposite to said net ionic charge of said analyte;

mixing a solution including said analyte and said reagent;

allowing said solution to form at least one variety of a non-covalent complex of a number, m, of said reagent moieties and a number, n, of said analyte moieties, said complex having a molecular weight, m, of $mM_B$ plus $nM_A$ plus zH, a net ionic charge of z when subjected to ionization in a mass spectrometer, and a mass-to-charge ratio of m/z;

analyzing said sample by soft ionization mass spectrometry to generate a plot over a range of values of relative abundance versus a range of values of mass-to-charge ratio, said plot including a peak at a mass-to-charge ratio, X, corresponding to said mass-to-charge ratio of said complex; and calculating $M_A$ from said mass-to-charge ratio, X.

* * * * *

SEQUENCE LISTING ( 1 ) GENERAL INFORMATION:

( i i i ) NUMBER OF SEQUENCES: 12

( 2 ) INFORMATION FOR SEQ ID NO:1:

( i ) SEQUENCE CHARACTERISTICS:
( A ) LENGTH: 6 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: internal ( v i ) ORIGINAL SOURCE:
( A ) ORGANISM: NONE (SYNTHETIC HUMAN NEUROTENSIN FRAGMENT 8-13)

( x i ) SEQUENCE DESCRIPTION: SEQ ID NO:1:

```
Arg Arg Pro Tyr Ile Leu
1               5
```

( 2 ) INFORMATION FOR SEQ ID NO:2:

( i ) SEQUENCE CHARACTERISTICS:
( A ) LENGTH: 9 amino acids
( B ) TYPE: amino acid
( C ) STRANDEDNESS: single ( D ) TOPOLOGY: linear ( i i ) MOLECULE TYPE: peptide ( i i i ) HYPOTHETICAL: NO ( i v ) ANTI-SENSE: NO ( v ) FRAGMENT TYPE: N-terminal ( v i ) ORIGINAL SOURCE:
( A ) ORGANISM: NONE (SYNTHETIC PORCINE DYNORPHIN FRAGMENT 1-9)

( x i ) SEQUENCE DESCRIPTION: SEQ ID NO:2:

```
Tyr Gly Gly Phe Leu Arg Arg Ile Arg
1               5
```

( 2 ) INFORMATION FOR SEQ ID NO:3:

( i ) SEQUENCE CHARACTERISTICS:
( A ) LENGTH: 9 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC PEPTIDE)

( x i ) SEQUENCE DESCRIPTION: SEQ ID NO:3:

```
Arg Lys Lys Arg Arg Gln Arg Arg Arg
1               5
```

( 2 ) INFORMATION FOR SEQ ID NO:4:

( i ) SEQUENCE CHARACTERISTICS:
( A ) LENGTH: 10 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC PEPTIDE)

( x i ) SEQUENCE DESCRIPTION: SEQ ID NO:4:

```
Arg Arg Arg Arg Arg Arg Pro Tyr Ile Leu
1               5                   10
```

( 2 ) INFORMATION FOR SEQ ID NO:5:

( i ) SEQUENCE CHARACTERISTICS:
( A ) LENGTH: 13 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO -continued ( v i ) ORIGINAL SOURCE:
( A ) ORGANISM: NONE (SYNTHETIC TYROSINE PROTEIN KINASE SUBSTRATE)

( x i ) SEQUENCE DESCRIPTION: SEQ ID NO:5:

Arg Arg Leu Ile Glu Asp Asn Glu Tyr Thr Ala Arg Gly
1 5 10

( 2 ) INFORMATION FOR SEQ ID NO:6:

( i ) SEQUENCE CHARACTERISTICS:
( A ) LENGTH: 13 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC RENIN SUBSTRATE FRAGMENT 1-13)

( x i ) SEQUENCE DESCRIPTION: SEQ ID NO:6:

Asp Arg Val Tyr Ile His Pro Phe His Leu Val Ile His
1 5 10

( 2 ) INFORMATION FOR SEQ ID NO:7:

( i ) SEQUENCE CHARACTERISTICS:
( A ) LENGTH: 20 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC PEPTIDE)

( x i ) SEQUENCE DESCRIPTION: SEQ ID NO:7:

Arg Gly Arg Gly Arg Gly Arg Gly Arg Gly Arg Gly Arg Gly Arg Gly
1 5 10 15

Arg Gly Arg Gly
20

( 2 ) INFORMATION FOR SEQ ID NO:8:

( i ) SEQUENCE CHARACTERISTICS:
( A ) LENGTH: 26 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: Apis mellifera ( x i ) SEQUENCE DESCRIPTION: SEQ ID NO:8:

Gly Ile Gly Ala Val Leu Lys Val Leu Thr Thr Gly Leu Pro Ala Leu

-continued 1 5 10 15

Ile Ser Trp Ile Lys Arg Lys Arg Gln Gln
20 25

( 2 ) INFORMATION FOR SEQ ID NO:9:

( i ) SEQUENCE CHARACTERISTICS:
( A ) LENGTH: 24 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC PEPTIDE)

( x i ) SEQUENCE DESCRIPTION: SEQ ID NO:9:

Ile Arg Arg Glu Arg Asn Lys Met Ala Ala Ala Lys Ser Arg Asn Arg
1 5 10 15

Arg Arg Glu Leu Thr Asp Thr Leu
20

( 2 ) INFORMATION FOR SEQ ID NO:10:

( i ) SEQUENCE CHARACTERISTICS:
( A ) LENGTH: 30 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC PEPTIDE)

( x i ) SEQUENCE DESCRIPTION: SEQ ID NO:10:

Arg Gly Arg Gly Arg Gly Arg Gly Arg Gly Arg Gly Arg Gly Arg Gly
1 5 10 15

Arg Gly Arg Gly Arg Gly Arg Gly Arg Gly Arg Gly Arg Gly
20 25 30

( 2 ) INFORMATION FOR SEQ ID NO:11:

( i ) SEQUENCE CHARACTERISTICS:
( A ) LENGTH: 31 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC HUMAN BETA-ENDORPHIN)

( x i ) SEQUENCE DESCRIPTION: SEQ ID NO:11:

Tyr Gly Gly Phe Met Thr Ser Glu Lys Ser Gln Thr Pro Leu Val Thr
1 5 10 15

-continued

| | | | | | | | | | | | | | | |
|---|---|---|---|---|---|---|---|---|---|---|---|---|---|---|
| Leu | Phe | Lys | Asn | Ala | Ile | Ile | Lys | Asn | Ala | Tyr | Lys | Lys | Gly | Glu |
| | | | 20 | | | | | 25 | | | | | 30 | |

( 2 ) INFORMATION FOR SEQ ID NO:12:

( i ) SEQUENCE CHARACTERISTICS:
( A ) LENGTH: 44 amino acids
( B ) TYPE: amino acid
( C ) STRANDEDNESS: single
( D ) TOPOLOGY: linear ( i i ) MOLECULE TYPE: peptide ( i i i ) HYPOTHETICAL: NO ( i v ) ANTI-SENSE: NO ( v i ) ORIGINAL SOURCE:
( A ) ORGANISM: NONE (SYNTHETIC BOVINE GROWTH HORMONE RELEASING FACTOR)

( x i ) SEQUENCE DESCRIPTION: SEQ ID NO:12:

| | | | | | | | | | | | | | | | |
|---|---|---|---|---|---|---|---|---|---|---|---|---|---|---|---|
| Tyr | Ala | Asp | Ala | Ile | Phe | Thr | Asn | Ser | Tyr | Arg | Lys | Val | Leu | Gly | Gln |
| 1 | | | | 5 | | | | | 10 | | | | | 15 | |
| Leu | Ser | Ala | Arg | Lys | Leu | Leu | Gln | Asp | Ile | Met | Asn | Arg | Gln | Gln | Gly |
| | | | 20 | | | | | 25 | | | | | 30 | | |
| Glu | Arg | Asn | Gln | Glu | Gln | Gly | Ala | Lys | Val | Arg | Leu | | | | |
| | | 35 | | | | | 40 | | | | | | | | |